(12) United States Patent
Hirose et al.

(10) Patent No.: US 12,266,024 B2
(45) Date of Patent: Apr. 1, 2025

(54) CONTENT SERVER, CONTENT SELLING SYSTEM, AND PROGRAM

(71) Applicant: MICWARE CO., LTD., Hyogo (JP)

(72) Inventors: Kanako Hirose, Hyogo (JP); Sumito Yoshikawa, Hyogo (JP)

(73) Assignee: MICWARE CO., LTD., Hyogo (JP)

( * ) Notice: Subject to any disclaimer, the term of this patent is extended or adjusted under 35 U.S.C. 154(b) by 0 days.

(21) Appl. No.: 18/807,285

(22) Filed: Aug. 16, 2024

(65) Prior Publication Data

US 2024/0403976 A1 Dec. 5, 2024

Related U.S. Application Data

(63) Continuation of application No. PCT/JP2024/008854, filed on Mar. 7, 2024.

(30) Foreign Application Priority Data

| Mar. 8, 2023 | (JP) | ................................. 2023-035769 |
| Mar. 15, 2023 | (JP) | ................................. 2023-041366 |

(Continued)

(51) Int. Cl.
*G06Q 30/00* (2023.01)
*G06Q 30/06* (2023.01)
(Continued)

(52) U.S. Cl.
CPC ............. *G06Q 50/01* (2013.01); *G06Q 30/06* (2013.01); *G06Q 50/184* (2013.01)

(58) Field of Classification Search
CPC .............................................. G06Q 30/06–08
See application file for complete search history.

(56) References Cited

U.S. PATENT DOCUMENTS

| 10,277,699 B1 * | 4/2019 | Ali ......................... H04L 67/56 |
| 11,443,390 B1 * | 9/2022 | Caligaris .............. G06Q 40/125 |

(Continued)

FOREIGN PATENT DOCUMENTS

| JP | 2008-112432 A | 5/2008 |
| JP | 2013-093010 A | 5/2013 |
| JP | 2021-086440 A | 6/2021 |

OTHER PUBLICATIONS

"State Intellectual Property Office of China Receives Aisino Corp's Patent Application for Enterprise Risk Identification Method and System Based on Enterprise Purchase-Sale Relation Graph", Global IP News, Business and Commerce Patent News, Oct. 26, 2021 (Year: 2021).*

(Continued)

*Primary Examiner* — Ethan D Civan
(74) *Attorney, Agent, or Firm* — Nakanishi IP Associates, LLC

(57) ABSTRACT

A content server (250) for managing a digital content item (80) sold in a content market (65) includes a content communication device (52) that communicates with a member terminal (40) including a display (40a) and a content control device (251) that causes the display (40a) to display an analytical graph (201a) through the content communication device (52). The analytical graph (201a) includes two or more nodes (202) representing different entities extracted from sales data and contract information and an edge (203) representing a relationship between the two or more nodes (202). The analytical graph (201a) includes the edge (203) extending from a node (202), as a center, representing identification information of the digital content item (80) to a node (202) representing an entity different from an entity for the digital content item (80).

4 Claims, 19 Drawing Sheets

(30) Foreign Application Priority Data

Mar. 7, 2024 (JP) ................................ 2024-034790
Mar. 7, 2024 (JP) ................................ 2024-034791
Mar. 7, 2024 (JP) ................................ 2024-034792

(51) Int. Cl.
*G06Q 50/00* (2012.01)
*G06Q 50/18* (2012.01)

(56) References Cited

U.S. PATENT DOCUMENTS

2013/0246179 A1* 9/2013 Shrock ............... G06Q 30/0641
                                                    705/14.58
2022/0292137 A1* 9/2022 Suh ........................ G06F 16/26

OTHER PUBLICATIONS

International Search Report issued in PCT/JP2024/008854 mailed on May 14, 2024 with English Translation (5 pages).
Written Opinion of International Searching Authority issued in PCT/JP2024/008854 mailed on May 14, 2024 with English Translation (6 pages).
Website of Alphapolis Inc. (https://www.alphapolis.co.jp/company/business/#model) (6 pages).
Advertisement in Website of Alphapolis Inc. (https://www.alphapolis.co.jp/campaign/1901/incentive) (6 pages).
Notice of Decision to Grant Patent issued in Japanese Patent Application No. 2024-034792 mailed Sep. 4, 2024, with English Translation (6 pages).

* cited by examiner

FIG. 4A

```
         80           31
          ↘           ↘
   ┌─81──────┬─81──────┬─81──────┐     ┌─81──────┐
   │ First   │ Second  │ Third   │  ~  │ N-th    │
   │component│component│component│     │component│
   └─────────┴─────────┴─────────┘     └─────────┘
        Authority : Registration         Authority : Registration
              I D : hanako                    I D : TARO
           Member type :                   Member type :
           Main member                    Main member
        Allocation : 3 0 %              Allocation : ○○%
```

FIG. 4B

```
         80           31
          ↘           ↘
   ┌─81──────┬─81──────┬─81──────┐     ┌─81──────┐
   │ First   │ Second  │ Third   │  ~  │ N-th    │
   │component│component│component│     │component│
   └─────────┴─────────┴─────────┘     └─────────┘
     Authority : Registration   Authority :      Authority : Registration
        I D : hanako            Registration          I D : TARO
                                I D : yamada
        Member type :           Member type :    Member type :
        Main member             Main member      Main member
     Allocation : 2 0 %      Allocation : 10%   Allocation : ○○%
```

CONTENT SERVER, CONTENT SELLING SYSTEM, AND PROGRAM

CROSS-REFERENCE TO RELATED APPLICATIONS

This application is a continuation application of International Patent Application No. PCT/JP2024/008854 filed on Mar. 7, 2024, which claims priority to Japanese Patent Applications No. 2023-035769 filed on Mar. 8, 2023, No. 2023-041366 filed on Mar. 15, 2023, No. 2024-034790 filed on Mar. 7, 2024, No. 2024-034791 filed on Mar. 7, 2024, and No. 2024-034792 filed on Mar. 7, 2024, the entire contents of which are incorporated by reference.

BACKGROUND OF INVENTION

Field of the Invention

The present invention relates to a content server, a content selling system, and a program.

Background Art

Non-Patent Literature 1 describes a business model of earning a profit by collecting content items such as novels or cartoons contributed to Internet websites and publishing the content items as books after improving the quality or marketability of the content items.

As described in Non-Patent Literature 2, the business model described in Non-Patent Literature 1 shares the advertising revenue of a website among contributors based on, for example, the popularity of the contributed works. This business model thus offers incentives to the contributors.

For convenience, a system managing many content items may allow authors or users to browse the overviews of the content items.

For example, Patent Literature 1 describes a character-relationship graph generation device that can generate a character-relationship graph showing the details of a content item in a simplified manner. The character-relationship graph shows the interrelations between characters in the content item using edges connecting nodes, with the characters used as labels of the nodes.

CITATION LIST

Non-Patent Literature

Non-Patent Literature 1: https://www.alphapolis.co.jp/company/business/#model
Non-Patent Literature 2: https://www.alphapolis.co.jp/campaign/1901/incentive

Patent Literature

Patent Literature 1: Japanese Unexamined Patent Application Publication No. 2008-112432

SUMMARY OF INVENTION

Technical Problem

However, the graph described in Patent Literature 1 simply includes one type of node label representing characters, and is less easily usable for other purposes such as analysis.

One or more aspects of the present invention are directed to a content server, a content selling system, and a program that allow generation of a graph for analysis of the relationship between two or more factors.

Solution to Problem

A content server according to an aspect of the present invention manages at least one digital content item. The at least one digital content item is sold in a content market. The at least one digital content item includes components. The components are produced by two or more members of a community. The content server includes a content communication device and a content control device. The content communication device communicates with a member terminal. The member terminal includes a display. The member terminal is possessed by each of the two or more members. The content control device obtains sales data and contract information. The sales data indicates the sales of the at least one digital content item in the content market. The contract information indicates the components included in the at least one digital content item and the two or more members who have produced the components. The content control device causes the display to display a graph through the content communication device. The graph includes two or more nodes and an edge. The two or more nodes represent different entities extracted from the sales data and the contract information. The edge represents a relationship between the two or more nodes. The graph includes identification information of the at least one digital content item as one of the entities. The graph includes a sales amount of the at least one digital content item in the content market as one of the entities. The graph includes identification information of the components as one of the entities. The graph includes identification information of the two or more members as one of the entities. The graph includes the edge extending from a node, as a center, of the two or more nodes representing the identification information of the at least one digital content item to a node of the two or more nodes representing an entity of the entities different from an entity for the at least one digital content item.

The graph displayed on the display in each member terminal systematically shows the relationship between factors, including the members, the components produced by the members, the digital content item including the components, and sales of the digital content item. The content server causes the display in each member terminal to display a graph collectively and clearly showing, to the members, the relationship between the factors including people, goods, and money, thus facilitating analysis of the relationship between two or more factors.

In the content server according to the above aspect, the graph shows a member of the two or more members who has produced a corresponding component of the components by connecting, with the edge, a node of the two or more nodes representing the identification information of the corresponding component and a node of the two or more nodes representing the identification information of the member. The graph shows a component of the components included in the at least one digital content item by connecting, with the edge, a node of the two or more nodes representing the identification information of the component and a node of the two or more nodes representing the identification information of the at least one digital content item. The at least one digital content item includes a first digital content item and a second digital content item. The graph shows that the second digital content item is a derivative work produced by using the first digital content item by connecting, with the edge, a node of the two or more nodes representing the identification information of the first digital content item and a node of the two or more nodes representing the identification information of the second digital content item.

The content server can cause the display in each member terminal to display the graph showing each member who has produced the corresponding component included in the digital content item used as a derivative work. Such a graph allows analysis of the relationship among producers, the components, and derivative uses.

In the content server according to the above aspect, in response to an instruction from a member of the two or more members, the content control device switches the graph displayed on the display from the graph having, as a center, the node representing the identification information of the at least one digital content item to a graph having, as a center, a node of the two or more nodes representing the entity different from the entity for the at least one digital content item. The content control device can thus cause the display to display an analytical graph convenient to users.

In the content server according to the above aspect, the graph further includes a node representing a change. The change indicates a change from the first digital content item being a primary work to the second digital content item being the derivative work. The node representing the change is connected to the node representing the identification information of the second digital content item being the derivative work with the edge. The graph further includes a node representing a price at which the first digital content item or the second digital content item is sold in the content market. The content control device can cause the display to display the graph that allows analysis based on more factors.

A content selling system according to an aspect of the present invention includes a content market, a user terminal, a content control device, and a content database. The content market sells a digital content item. The digital content item includes two or more components. The digital content item is produced by members of a community. The user terminal is possessed by a user. The user purchases the digital content item from the content market. The content control device manages the members. The content control device obtains sales data and contract information. The sales data is sales data of the digital content item in the content market. The contract information indicates the two or more components included in the digital content item and the members who have produced the two or more components. The content control device generates a graph. The graph includes two or more nodes and an edge. The two or more nodes represent different entities extracted from the sales data and the contract information. The edge represents a relationship between the two or more nodes. The content database stores the graph. The graph includes, as the entities, identification information of the digital content item, a sales amount of the digital content item in the content market, identification information of the two or more components, and identification information of the members. The graph includes the edge extending from a node, as a center, of the two or more nodes representing the identification information of the digital content item to a node of the two or more nodes representing an entity of the entities different from an entity for the digital content item. The content selling system can thus collectively manage complex information about digital content items with a reduced data volume.

Advantageous Effects

The technique according to the aspects of the present invention allows generation of a graph for analysis of the relationship between two or more factors.

BRIEF DESCRIPTION OF THE DRAWINGS

FIG. 4A is a conceptual diagram of contract information indicating authority and rewards of the members of the community.

FIG. 4B is a conceptual diagram of contract information when a main member joins in.

DETAILED DESCRIPTION

First Embodiment

Figure 1:
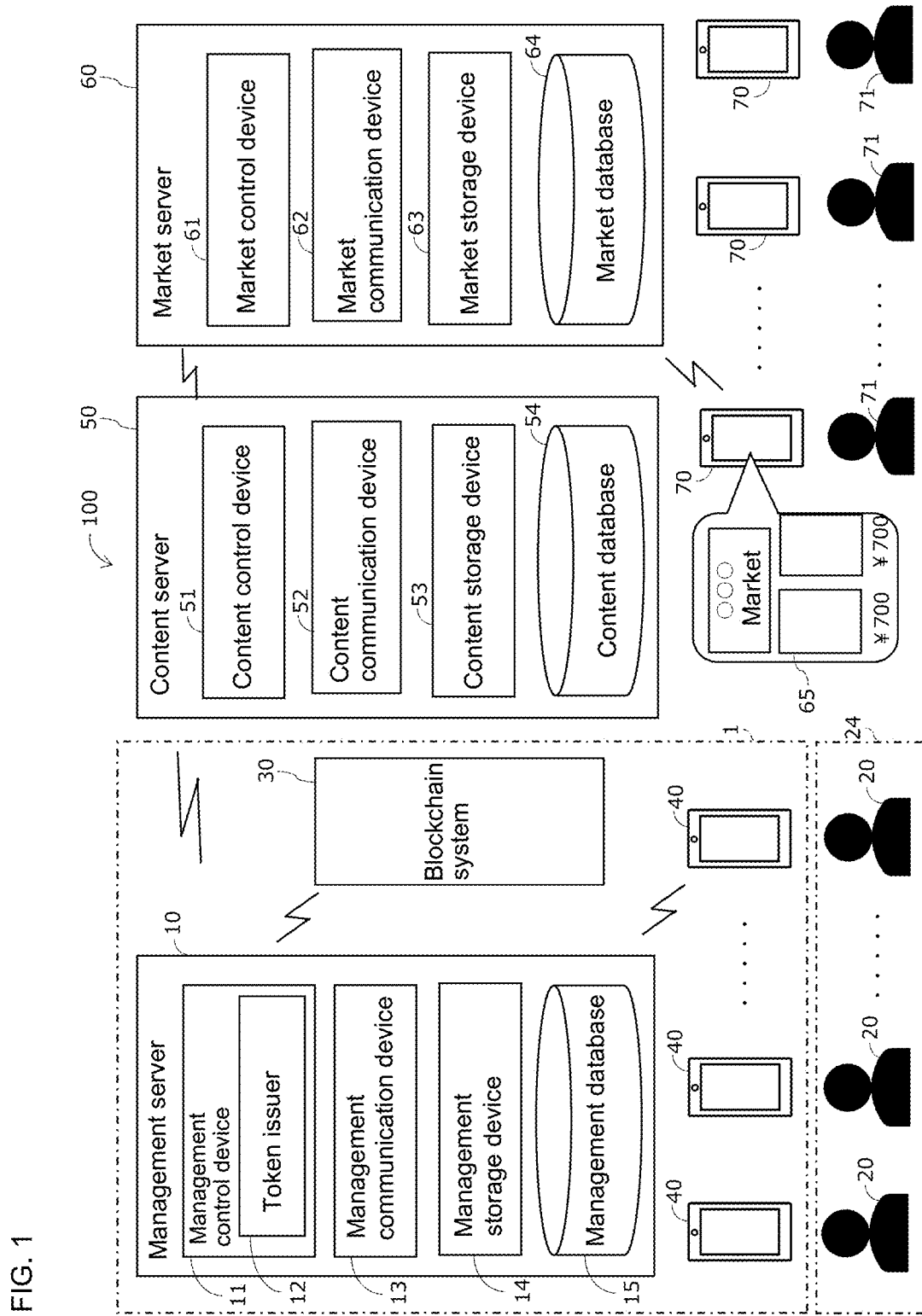
FIG. 1 is a schematic block diagram of a content selling system including a management server according to a first embodiment.

As shown in FIG. 1, a content selling system 100 according to a first embodiment of the present invention includes a management server 10, member terminals 40, a blockchain system 30, a content server 50, a market server 60, and user terminals 70. The content selling system 100 includes a management system 1. The management system 1 includes the management server 10 and the blockchain system 30.

Figure 2:
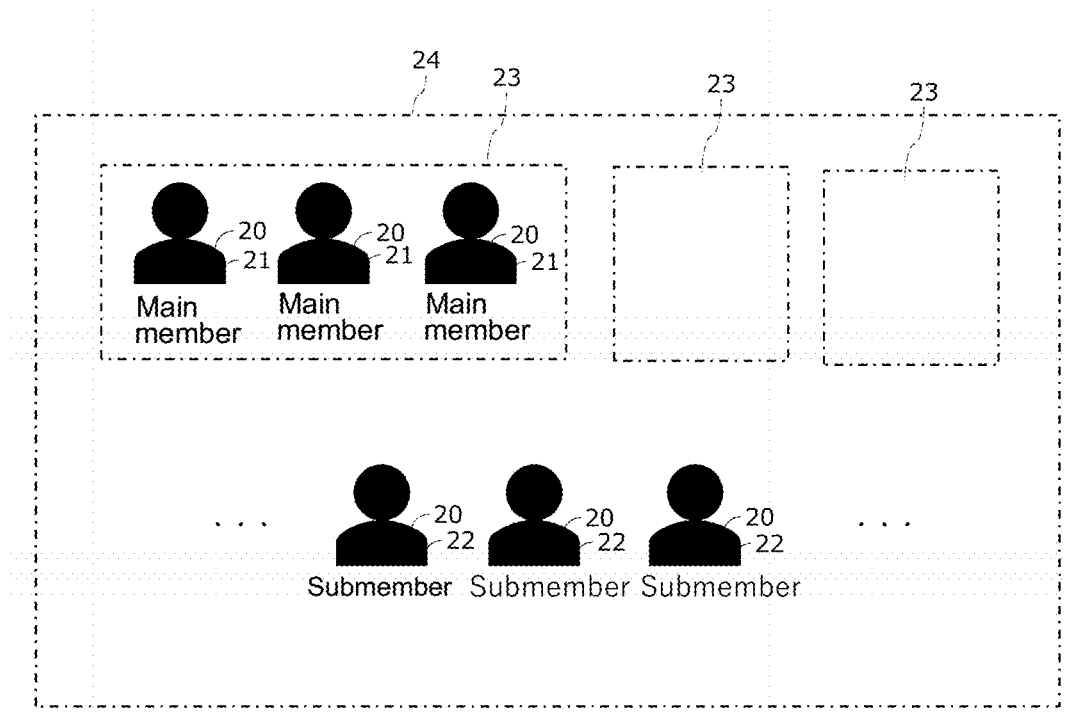
FIG. 2 is a conceptual diagram of a community for producing digital content items.
Figure 3:
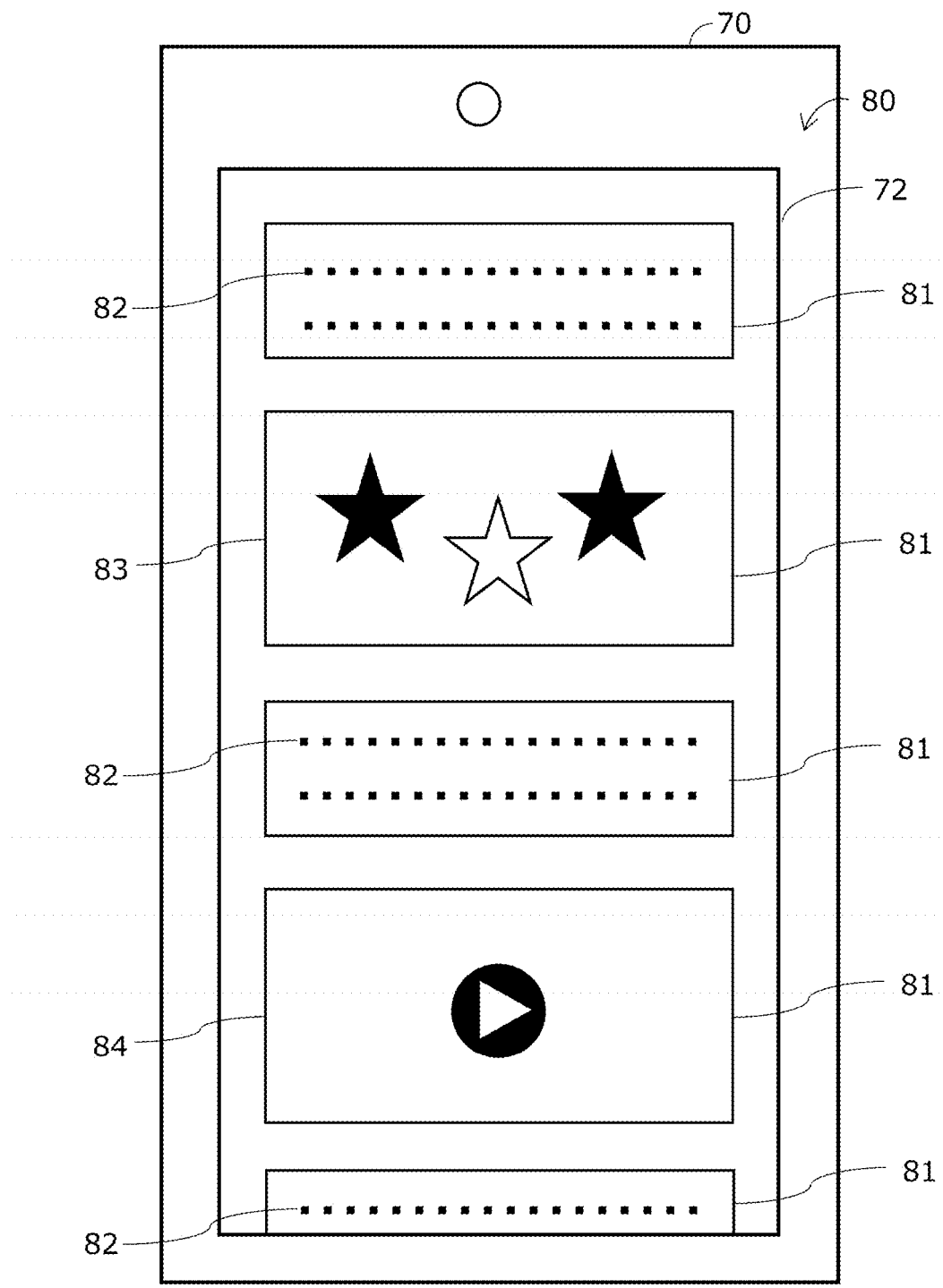
FIG. 3 is a conceptual diagram of a digital content item displayed on a user terminal.

The management server 10 manages members 20 of a community 24 as shown in FIG. 2. The members 20 of the community 24 produce digital content items 80 as shown in FIG. 3. The management server 10 communicates with the member terminals 40. The member terminals 40 are possessed by the members 20 of the community 24. In the present embodiment, the management server 10 communicates with the blockchain system 30. The blockchain system 30 uses a blockchain. The blockchain is a technology for a database to directly connect terminals in an information communication network to one another. The blockchain processes and records transaction records in a decentralized manner with cryptography. In the present embodiment, information corresponding to transaction records of a blockchain is contract information described later. The blockchain system 30 corresponds to a storage system. The management server 10 communicates with the content server 50. The content server 50 stores digital content data. The digital content data is data of the digital content items 80 produced by the members 20 of the community 24. The content server 50 communicates with the market server 60. The market server 60 implements a content market 65. The content market 65 is a website for purchasing and selling the digital content items 80. The market server 60 obtains, from the content server 50, digital content data to be sold in the content market 65. The market server 60 communicates with the user terminals 70. The user terminals 70 are possessed by users 71 who intend to purchase digital content data in the content market 65. The member terminals 40 and the user terminals 70 are information communication terminals such as smartphones, mobile phones, tablets, or personal computers.

As shown in FIG. 2, the community 24 includes two or more teams 23. Each team 23 in the community 24 produces a digital content item 80. Each team 23 contributes the produced digital content item 80 to the content market 65. The members 20 of the community 24 are classified by the type of members. In the present embodiment, two types of members are available, which are main members 21 and submembers 22. The main members 21 belong to the teams 23. More specifically, each team 23 includes one or more main members 21. The main members 21 in each team 23 cooperate with other main members 21 belonging to the same team 23 to produce one digital content item 80. When the team 23 has simply one main member 21, this main member 21 produces the digital content item 80.

Each main member 21 has the authority to produce a digital content item 80. More specifically, the authority in the present embodiment is the authority to register a component 81 with a format 55 shown in FIG. 5. The format 55 is used to contribute digital content items 80 to the content market 65. The format 55 is displayed on the member terminals 40. The submembers 22 do not belong to any team 23. The submembers 22 assist in producing digital content items 80. The submembers 22 can undertake an assignment associated with the production of a digital content item 80 when offered by the main members 21. The submembers 22 do not have the authority described above. When granted the authority, the submembers 22 are allowed to belong to the teams 23. More specifically, when granted the authority, the submembers 22 become main members 21. The authority is allocated from the main members 21 to the submembers 22. The main members 21 can allocate part of the authority possessed by the main members 21 to the submembers 22.

The members 20 are each allowed to have an allocation right. The allocation right allows right holders to receive rewards. In the present embodiment, the allocation right allows right holders to receive at least part of any sales of digital content items 80 in the content market 65. Each main members 21 has an allocation right corresponding to the authority.

The content market 65 sells digital content items 80 as shown in, for example, FIG. 3. The content market 65 provides a place to sell digital content items 80 as shown in, for example, FIG. 3, and is implemented by the market server 60. Each digital content item 80 includes two or more components 81. In the present embodiment, each component 81 is text 82, an illustration 83, a photo or video 84, a film, a sound, or music. Each component 81 may be a program that implements, for example, augmented reality (AR). Each digital content item 80 includes a combination of two or more components 81. The digital content item 80 may include two or more components 81 of the same type or different types. The digital content item 80 is produced by the members 20 in a shared manner, with each member 20 producing the corresponding component 81.

The management server 10 shown in FIG. 1 is a computer that manages the community 24. The management server 10 includes a management control device 11, a management communication device 13, a management storage device 14, and a management database 15. The management server 10 communicates with the member terminals 40 through the management communication device 13. When a submember 22 joins a team 23, the management communication device 13 receives new joiner information from the member terminal 40. The new joiner information includes the identification (ID) information and the address information of the main member 21 who newly joins the team 23. The ID information is used to identify the members 20. The ID information indicates the user name that is set by each member 20 as appropriate. The ID information may indicate the address of each member 20. The address information indicates, for example, the email address, the social network service (SNS) account, or the phone number. The management communication device 13 receives digital content data from the member terminals 40. The management server 10 communicates with the content server 50 through the management communication device 13. The management communication device 13 transmits digital content data to the content server 50.

Figure 4C:
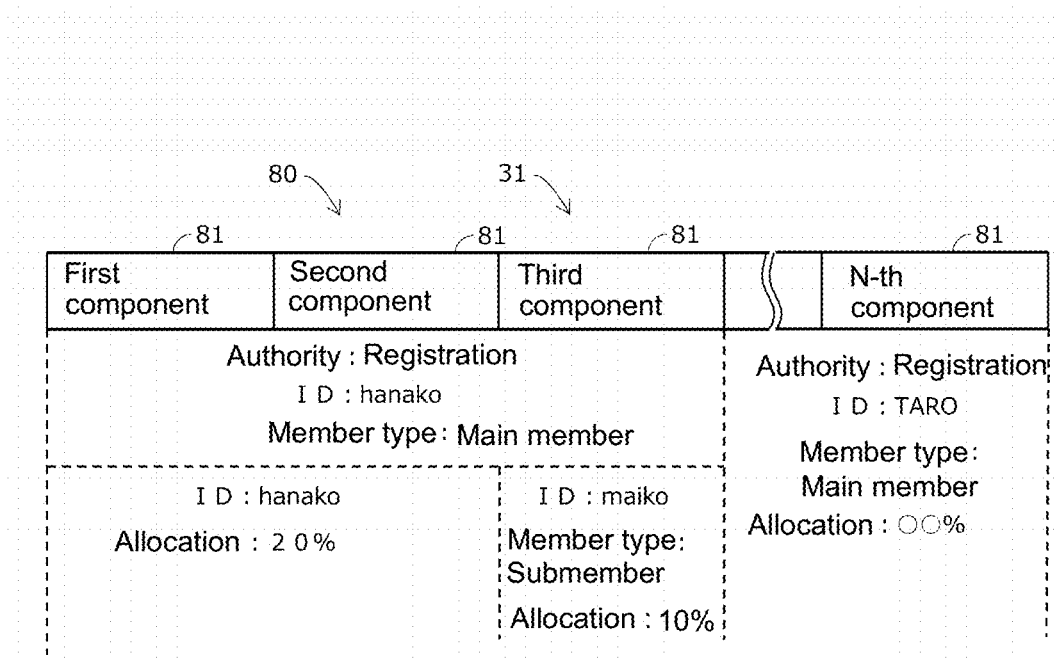
FIG. 4C is a conceptual diagram of contract information when an assignment is offered to a submember.

The management server 10 causes the blockchain system 30 to store the contract information. In the present embodiment, as shown in FIGS. 4A to 4C, the contract information indicates the authority, the ID, the member type, and the reward of each member 20. In another embodiment of the present invention, the contract information may eliminate the member type. In the contract information, the authority is set for each component 81. Granting authority is, for example, providing a password for registering the component 81 with the format 55. In the present embodiment, the contract information indicates, for each component 81, the ID and the reward of the member 20 who has the authority. The contract information indicates, in a manner associated with the ID of the corresponding main member 21, each component 81 having the authority being set. In the present embodiment, the reward is indicated by the allocation of any sales of digital content items 80 in the content market 65. The allocation is, for example, the percentage allocated from a net profit. The net profit is, for example, a profit obtained by deducting, for example, expenses including electricity bills for the management server 10, the content server 50, and the market server 60 and various license fees from the sales of the digital content item 80. The members 20 have allocation rights, and thus can receive, as the rewards, part of the sales of the digital content item 80 for which they are involved in production. The allocation rights are allocated to the submembers 22 from the main members 21. More specifically, the main members 21 can allocate part of their allocation rights to other submembers 22. The allocation right is allocated to the submembers 22 when the submembers 22 join the teams 23. The allocation right is allocated to the submembers 22 when, for example, the main members 21 offer assignments to the submembers 22. Each assignment is production of a component 81. The assignment is, for example, composing text, constructing text, drawing illustrations, photographing, producing a video, or producing a film. The assignment may include an assignment associated with sales promotion of a digital content item 80. The allocation right may be allocated by a submember 22 to another submember 22. More specifically, the submembers 22 can allocate part of their allocation rights to other submembers 22. The range of the allocation right to be allocated is determined by the members concerned with the content item. For example, the rate of allocation may be preset based on the assignment being offered, but may be determined by the member 20 who has offered the assignment evaluating the quality of the resulting product. In another embodiment of the present invention, the blockchain system 30 may be eliminated. In this case, the management server 10 causes the management database 15 to store the contract information.

In the manner described above, the management system 1 according to the present embodiment manages the members 20 of the community 24. The community 24 produces digital content items 80, and sells the digital content items 80 in the content market 65. Each digital content item 80 includes two or more components 81 produced by the members 20. The management system 1 includes the management communication device 13, the blockchain system 30, and the management control device 11. The management communication device 13 communicates with the member terminals 40. The member terminals 40 are possessed by the members 20. The blockchain system 30 stores contract information 31. The contract information 31 indicates, in a manner associated with the corresponding ID, each component 81 having authority being set. The contract information 31 indicates the allocation of sales in a manner associated with IDs. The IDs identify the members 20. The authority is used for registration with the format 55. The format 55 is used when digital content items 80 are contributed to the content market 65. The sales are any sales of digital content items 80 in the content market 65. The management control device 11 transmits tokens to the member terminals 40 through the management communication device 13 based on the contract information 31. The tokens correspond to the allocation.

Each main member 21 can thus produce components 81 produceable with his or her skills while entrusting other main members 21 with production of other components 81. This achieves the structure in which multiple members participate in the production of a digital content item 80 to receive rewards.

The contract information 31 is updated as appropriate based on the state of the community 24. The contract information 31 is updated upon a submember 22 joining a team 23 and becoming a new main member 21. In the example described below, a submember 22 with the ID of yamada is invited by an existing main member 21 with the ID of hanako and joins the team 23. As shown in FIG. 4A, in a first state, hanako has the authority for the first to third components 81 with the allocation right of 30%. When yamada becomes a new main member 21, as shown in FIG. 4B, the components 81 for which hanako has the authority are reduced to the first and second components 81. The authority for the third component 81 is transferred to yamada. The allocation right of hanako is reduced to 20%, whereas yamada obtains the allocation right of 10%. Thus, when a submember 22 joins a team 23 to be a main member 21, the management control device 11 can cause the blockchain system 30 to store the contract information 31 indicating, in a manner associated with the ID of the new main member 21, the component 81 corresponding to the authority allocated from the existing main member 21. When a submember 22 joins a team 23 to be a main member 21, the management control device 11 also causes the blockchain system 30 to store the contract information 31 indicating, in a manner associated with the ID of the new main member 21, the allocation corresponding to the allocation right allocated from the existing main member 21.

In an existing system, limited members in an organization have the authority over enrollment. Such enrollment may involve approval from other members in the organization and take a long time. In contrast, in the management system 1 according to the present embodiment, the main members 21 can freely allow submembers 22 to join the teams 23 under their authority. This system involves no approval from other main members 21 for joining of a new main member 21 and can thus reduce the time for enrollment, improving the quality of the digital content items 80.

In the example described below, the main member 21 with the ID of hanako enrolls a submember 22 with the ID of maiko. As shown in FIG. 4A, in a first state, hanako has the allocation right of 30%. After maiko undertakes an assignment, as shown in FIG. 4C, the allocation right of hanako is reduced to 20%, whereas maiko obtains the allocation right of 10%. When any of the main members 21 offers an assignment to any of the submembers 22, the management control device 11 causes the blockchain system 30 to store the contract information 31 indicating, in a manner associated with the ID of the submember 22, the allocation corresponding to the allocation right allocated from the main member 21. Thus, the main members 21 can freely enroll submembers 22 under their allocation rights, enhancing their work efficiency. By enrolling submembers 22 under their allocation rights, the main members 21 are easily motivated to properly evaluate the assignments of the submembers 22. The submembers 22 are thus more likely to be appropriately rewarded for their performance.

In the manner described above, the teams 23 using the content selling system 100 can implement a decentralized autonomous organization (DAO) in which the main members 21 spontaneously act without a centralized manager.

The management storage device 14 stores various programs executable by the management server 10. The various programs include a management program. The management program is executed to cause the management server 10 to store the contract information 31 and to allocate rewards based on the contract information 31. The management program is executed to issue tokens. The management storage device 14 may be any non-transitory tangible recording medium that records programs readable and executable by a computer. The management storage device 14 may be implemented by, for example, a flash memory, a hard disk drive (HDD), a solid-state drive (SSD), a flexible disk (FD), a magneto-optical disk (MO disk), a compact disc (CD), a digital versatile disc (DVD), a secure digital card (SD card), or a universal serial bus (USB) memory.

The management database 15 stores various items of data.

The management control device 11 controls the management communication device 13, the management storage device 14, and the management database 15. In the present embodiment, the management control device 11 causes the blockchain system 30 to store the contract information 31. The management control device 11 may cause the blockchain system 30 alone to store the contract information 31. The management control device 11 may cause each of the blockchain system 30 and the management database 15 to store the contract information 31. The management control device 11 may manage the contract information 31 by issuing utility tokens.

The management control device 11 functions as a token issuer 12. The token issuer 12 in the management control device 11 generates tokens corresponding to the allocation based on the contract information 31. The tokens are used in the same manner as the currency by the members 20 in the community 24 and the content market 65. The tokens are, for example, points or coupons. The management control device 11 transmits the generated tokens to the member terminals 40 through the communication device. In this manner, the management control device 11 issues tokens. More specifically, the token issuer 12 is a subroutine of the program that issues tokens.

Such a function of the management control device 11 is implemented by software. The software is described as programs, and stored into the management storage device 14. A central processing unit or CPU (not shown) reads and executes the programs stored in the management storage device 14 to implement the control operations performed by the management control device 11.

The content server 50 shown in FIG. 1 is a computer that stores digital content data. The content server 50 includes a content control device 51, a content communication device 52, a content storage device 53, and a content database 54. The content server 50 communicates with the management server 10 through the content communication device 52. The content communication device 52 receives digital content data produced by the teams 23 from the management server 10. The content control device 51 causes the content database 54 to store the received digital content data. The content communication device 52 transmits the digital content data to the market server 60. The content storage device 53 stores various programs executable by the content server 50.

The content control device 51 controls the content communication device 52, the content storage device 53, and the content database 54. The functions of the content control device 51 are implemented by software. The software is described as programs, and stored into the content storage device 53. A CPU (not shown) reads and executes the programs stored in the content storage device 53 to implement the control operations performed by the content control device 51.

The market server 60 is a computer for the content market 65. The market server 60 includes a market control device 61, a market communication device 62, a market storage device 63, and a market database 64. The market server 60 communicates with the content server 50 through the market communication device 62. The market server 60 communicates with the user terminals 70 through the market communication device 62. The market communication device 62 transmits digital content data purchased by the users 71 in the content market 65 to the user terminals 70. The market storage device 63 stores various programs executable by the market server 60. The market database 64 stores sales data and user data. The sales data indicates the sales of digital content items 80 in the content market 65. The user data indicates information about the users 71 in the content market 65.

The market control device 61 controls the market communication device 62, the market storage device 63, and the market database 64. The functions of the market control device 61 are implemented by software. The software is described as programs, and stored into the market storage device 63. A CPU (not shown) reads and executes the programs stored in the market storage device 63 to implement the control operations performed by the market control device 61.

Figure 5:
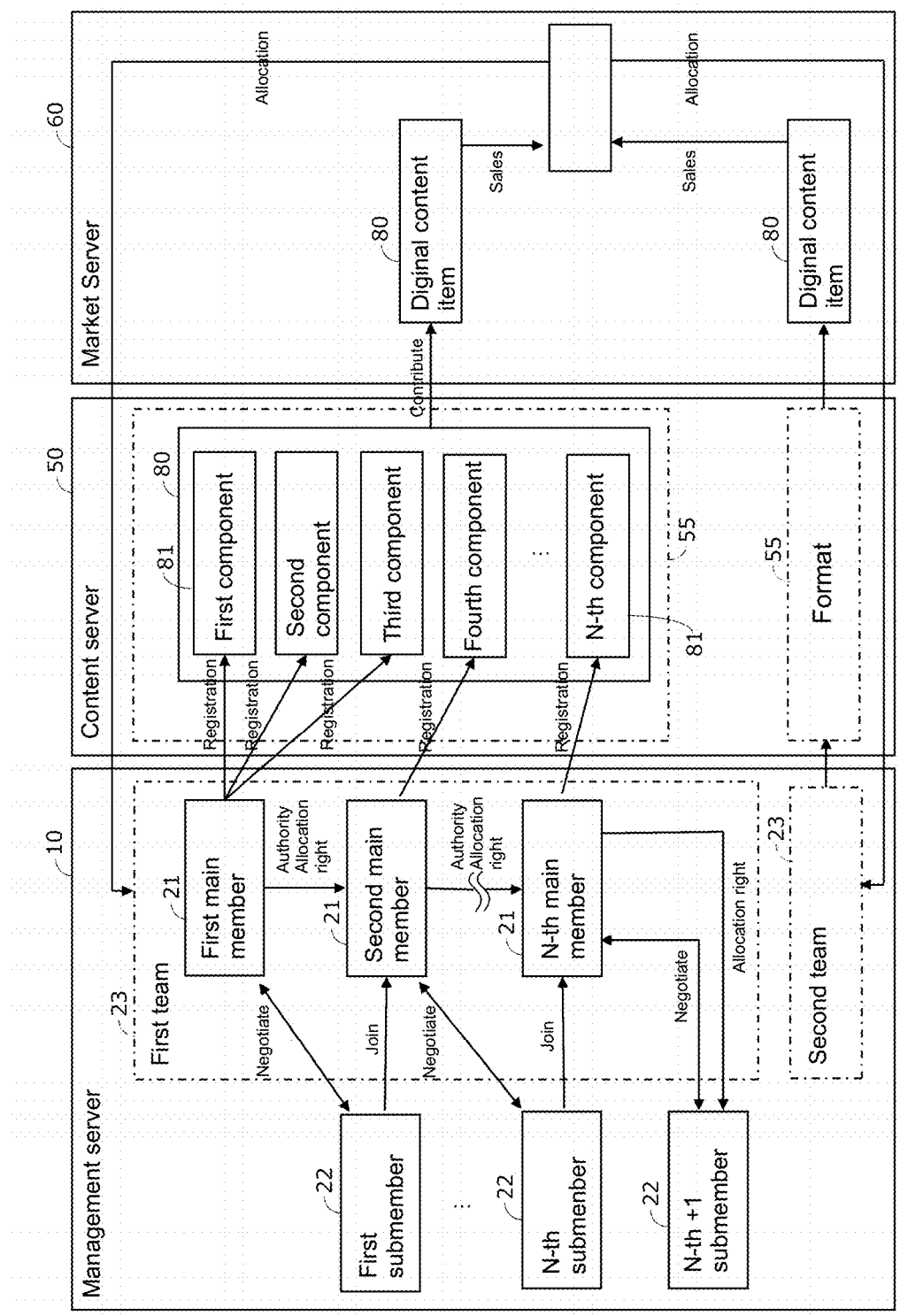
FIG. 5 is a block diagram of a content selling system.

As shown in FIG. 5, for example, the content selling system 100 described above allows a first main member 21 to negotiate with a first submember 22 to cause the first submember 22 to join a first team 23. The first submember 22 then becomes a second main member 21. The authority of the second main member 21 is allocated from the authority of the first main member 21. The allocation right of the second main member 21 is allocated from the allocation right of the first main member 21. The second main member 21 then negotiates with an n-th submember 22 to cause the n-th submember 22 to join the first team 23. The n-th submember 22 then becomes an n-th main member 21. The authority of the n-th main member 21 is allocated from the authority of the second main member 21. The allocation right of the n-th main member 21 is allocated from the allocation right of the second main member 21. The first team 23 is formed in this manner. One main member 21 can negotiate with any number of submembers 22 to cause the submembers 22 to join the team 23. The n-th main member 21 can negotiate with an (n+1)-th submember 22 to offer an assignment to the (n+1)-th submember 22. The allocation right of the (n+1)-th submember 22 is allocated from the allocation right of the n-th main member 21.

The components 81 registered with the format 55 by the main member 21 in the first team 23, or more specifically, a digital content item 80, is stored into the content server 50. The digital content item 80 is sold in the content market 65 using the market server 60. The net profit in the content market 65 is allocated to the members 20 using tokens based on the contract information 31.

Example of Implementation With Hardware

Figure 6:
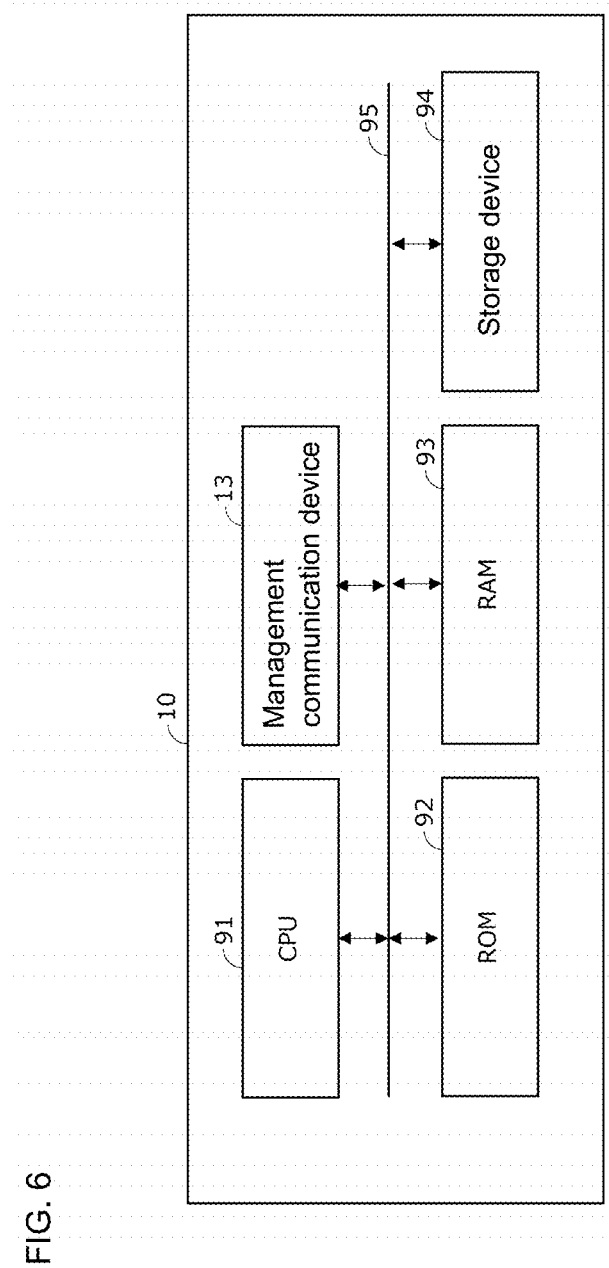
FIG. 6 is a block diagram of a management server, showing its hardware configuration.

The management server 10 is implemented by the hardware configuration shown in FIG. 6. The management server 10 includes a CPU 91, a read-only memory (ROM) 92, a random-access memory (RAM) 93, a storage device 94, the management communication device 13, and a bus 95. These components are implemented by, for example, a semiconductor integrated circuit that are one or more pieces of hardware, but may be implemented in any other manner.

The CPU 91 functions as a processing unit and a control device. The CPU 91 controls the overall operations of the management server 10 based on various programs. The CPU 91 executes the various programs stored in the ROM 92 using the RAM 93 as a workspace. By executing the programs, the CPU 91 functions as the management control device 11 in the management server 10.

The ROM 92 stores the programs or computation parameters to be used by the CPU 91. The ROM 92 stores, for example, the programs executable by the management control device 11.

The RAM 93 temporarily stores the programs to be used by the CPU 91 to perform control. The RAM 93 further temporarily stores, for example, variables that change as appropriate when the CPU 91 performs control. The RAM 93 is part of the management control device 11.

The storage device 94 is implemented by a device that can store information, such as a magnetic storage device, a semiconductor storage device, an optical storage device, or a magneto-optical storage device. The storage device 94 stores various items of data including the programs executable by the CPU 91 and data obtained from external devices.

The various items of data may include the contract information 31. The storage device 94 is part of the management database 15.

The management communication device 13 communicates with the content server 50 and other devices. The management communication device 13 mainly performs wireless communication, but may perform wired communication. The management communication device 13 may perform near-field communication. The management communication device 13 is, for example, a modem or a router.

The bus 95 connects the components of the management server 10 to one another. Thus, the components of the management server 10 can transmit and receive data with one another.

The content server 50 and the market server 60 have the same hardware configuration as the management server 10, and thus are not described in detail.

Figure 7:
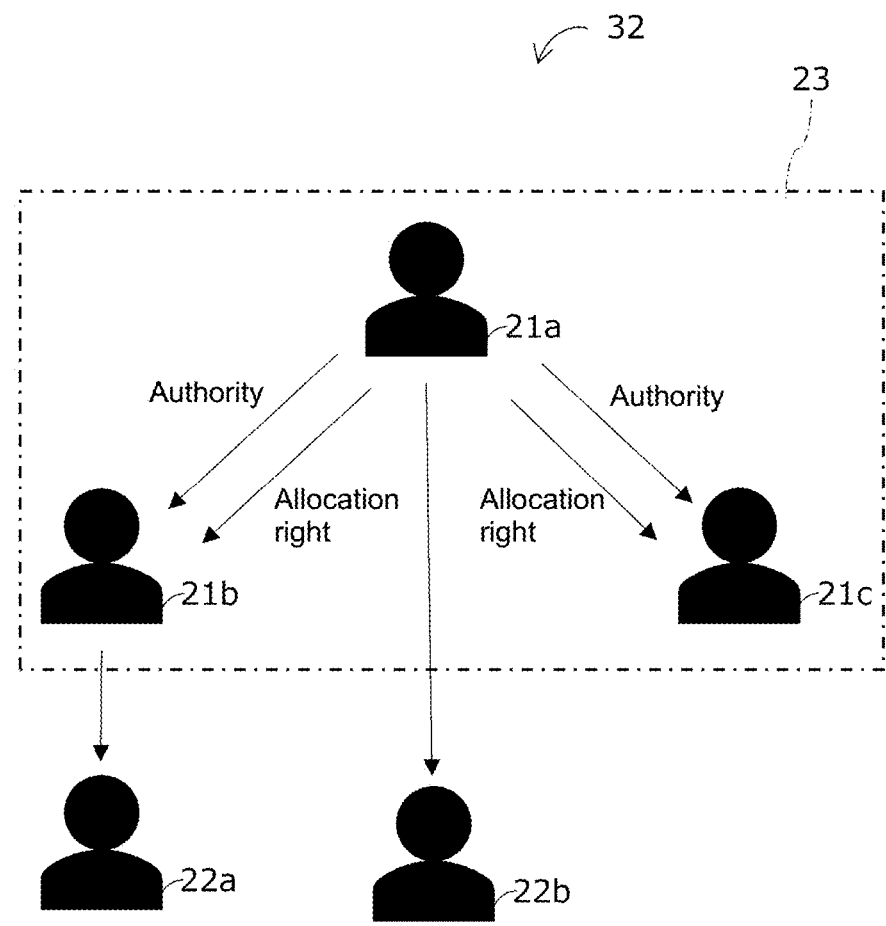
FIG. 7 is a conceptual diagram of a graph database.

In the first embodiment, the management server 10 causes the blockchain system 30 to store the contract information 31, but is not limited to this structure. The management server 10 may store the contract information 31 in the management database 15 using a graph database 32 shown in FIG. 7. The graph database 32 has a graph structure. The graph structure can show the relationship between nodes using three factors including nodes, edges, and properties. In the present modification, the nodes correspond to the members 20. Each edge corresponds to the relationship between members 20. The relationship is a parent-child relationship based on the contract information 31. For example, the main members 21 who have granted authority serve as parents. The members 20 who receive the authority serve as children. The properties are attribute information. The properties correspond to the authority allocated to the members 20. The properties correspond to the allocation rights allocated to the members 20. More specifically, the nodes correspond three main members 21*a*, 21*b*, and 21*c* and two submembers 22*a* and 22*b* shown in FIG. 7. One of the edges represents, for example, the parent-child relationship in which the main member 21*a* serves as a parent and the main member 21*b* serves as a child, with the main member 21*a* allocating the authority and the allocation right to the main member 21*b*. Another edge represents, for example, the parent-child relationship in which the main member 21*b* serves as a parent and the submember 22*a* serves as a child, with the main member 21*b* allocating the allocation right to the submember 22*a*. The management server 10 can store such complex relationships between the members 20 as appropriate using the graph database 32. The graph database 32 corresponds to a storage system.

Second Embodiment

Figure 8:
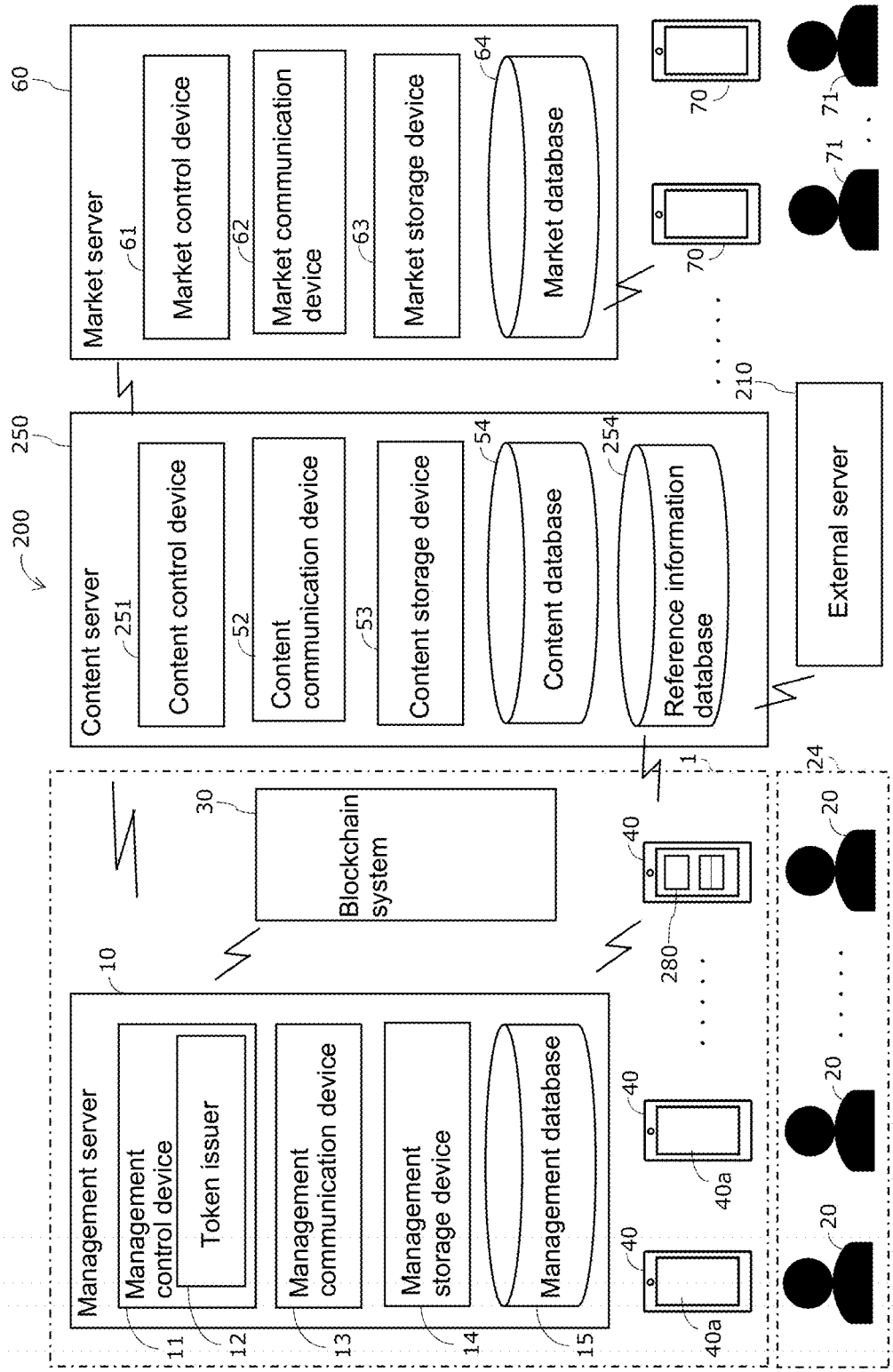
FIG. 8 is a schematic block diagram of a content selling system including a content server according to a second embodiment.

A content selling system 200 according to a second embodiment shown in FIG. 8 includes a management server 10, member terminals 40, a blockchain system 30, a content server 250, a market server 60, and user terminals 70. The content selling system 200 has the same structure as the content selling system 100 according to the first embodiment except for including a content server 250 in place of the content server 50. Like reference signs denote like components in the first embodiment, and such components are not described.

The content server 250 includes a content control device 251, a content communication device 52, a content storage device 53, a content database 54, and a reference information database 254. The content server 250 communicates with an external server 210 external to the content selling system 200 through the content communication device 52. The content server 250 communicates with the member terminals 40 through the content communication device 52. The member terminals 40 each include a display 40*a*. The display 40*a* is, for example, a liquid crystal display or an organic electroluminescent (EL) display. The content communication device 52 includes, for example, a transmitter and a receiver. The same applies to the management communication device 13 and the market communication device 62.

The content selling system 200 according to the present embodiment can indicate the overviews of digital content items 80 including text data to the members 20. The content selling system 200 can simultaneously indicate the overviews of two or more digital content items 80 stored in the content database 54. The content selling system 200 indicates the overviews of the digital content items 80 using a graph structure. The content selling system 200 causes the member terminals 40 to display the graph structure to indicate the overviews of the digital content items 80. Each digital content item 80 corresponds to activity performance information 280. The activity performance information 280 is generated based on the activities of the members 20 belonging to the community 24. The activity performance information 280 includes profile data (described later) of the members 20. A graph 201 generated based on the activity performance information 280 corresponds to an activity performance graph.

Figure 9:
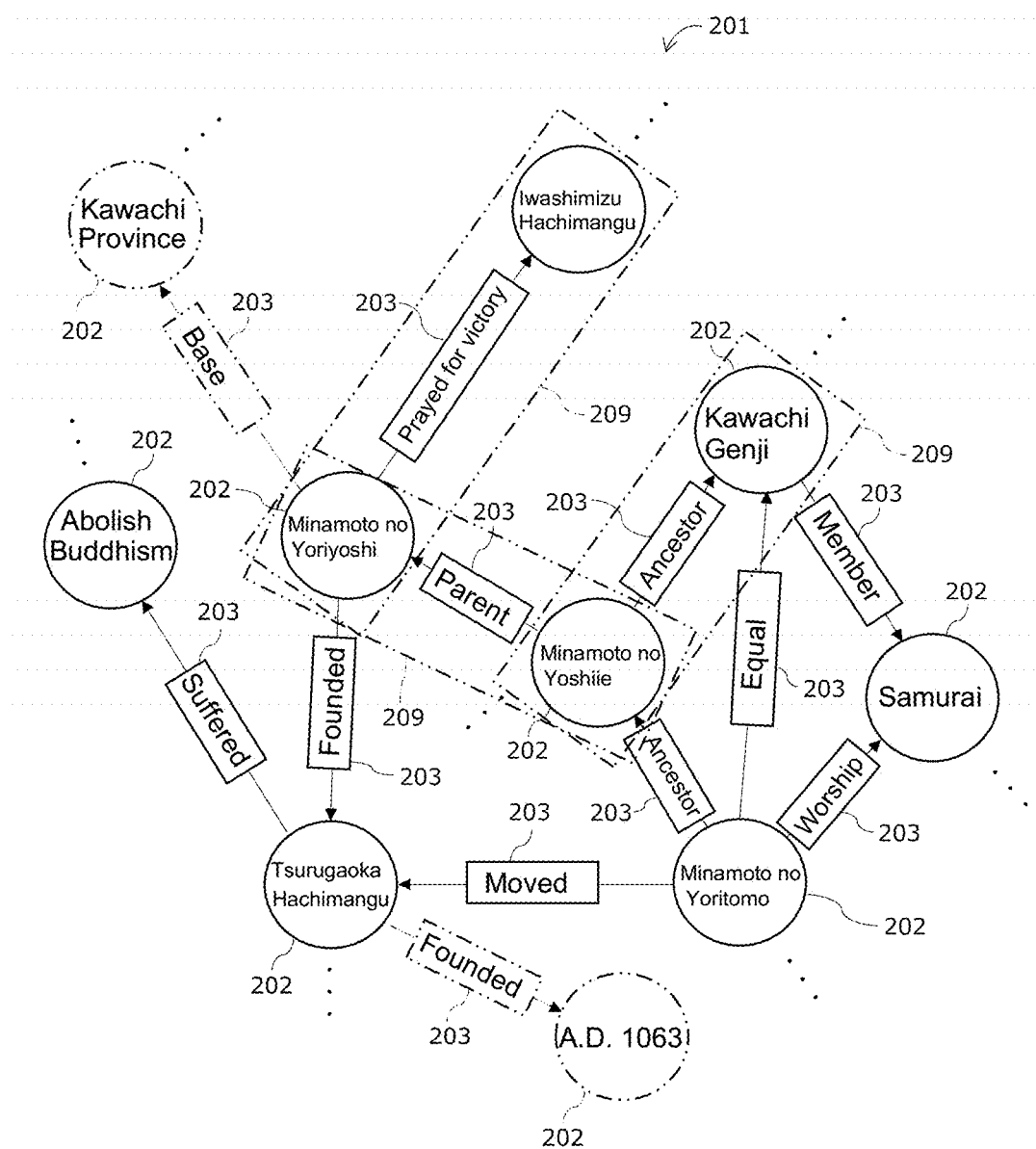
FIG. 9 is a diagram of an example graph for a digital content item.

As shown in FIG. 9, the graph 201 includes two or more triplets 209. The graph 201 has a graph structure. The graph 201 can be a set of triplets 209. Each triplet 209 includes two nodes 202 and an edge 203. Each node 202 represents an entity. The entities represented by the nodes 202 differ from one another. The entities are extracted from the text data included in digital content items 80. The entities are major factors for extracting information from the text data. The text data is text-based data. The entities are proper nouns, numeric representations, or temporal expressions. In the present embodiment, the entities may be characteristics of the members 20, declarations by the members 20, or the details of the activities. The characteristics of the members 20, declarations by the members 20, or the details of the activities are described later. Each triplet 209 may use one of these entities or two or more of these entities. The proper nouns include the name of a person, the name of an event, the name of a place, the name of an organization, and the name of a product. In the present embodiment, the name of a product includes the identification information of a digital content item 80 and the identification information of components 81. The numeric representation is, for example, the quantity, the amount of money, or a percentage. The temporal expression is, for example, date or time. The nodes 202 may include one entity or two or more entities. The entities may have their ranges predefined using any expression. Hereafter, the name of a person, the name of an event, and the name of a place may be described as people, goods, events, and places. Each edge 203 represents the relationship between the corresponding nodes 202. The graph 201 may be a directed graph including directed edges 203, or an undirected graph including undirected edges 203. For example, FIG. 9 illustrates a directed graph in which one of the edges 203 extends from the node 202 representing Minamoto no Yoriyoshi to the node 202 representing Tsurugaoka Hachimangu. Another edge 203 representing establishment associates the node 202 representing Minamoto no Yoriyoshi with the node 202 representing Tsurugaoka Hachimangu. More specifically, the graph 201 in FIG. 9 shows that Minamoto no Yoriyoshi founded Tsurugaoka Hachimangu.

The graph 201 in FIG. 9 shows the overview described below.

Minamoto no Yoriyoshi prayed for victory at Iwashimizu Hachimangu.

Minamoto no Yoriyoshi founded Tsurugaoka Hachimangu.

A parent of Minamoto no Yoshiie is Minamoto no Yoriyoshi.

Minamoto no Yoritomo moved Tsurugaoka Hachimangu to another location.

Minamoto no Yoritomo worshiped samurai.

Minamoto no Yoritomo was included in the Kawachi Genji.

An ancestor of Minamoto no Yoritomo is Minamoto no Yoshiie.

An ancestor of Minamoto no Yoshiie was included in the Kawachi Genji.

The members in Kawachi Genji were samurai.

Tsurugaoka Hachimangu suffered a movement to abolish Buddhism (haibutsu kishaku).

For example, the graph 201 in FIG. 9 is generated by extracting entities from the text data described below as a digital content item 80.

History of Tsurugaoka Hachimangu

Tsurugaoka Hachimangu was founded by Minamoto no Yoriyoshi, the second generation descendant of the Kawachi Genji, as Tsurugaoka Wakamiya when he invited a deity from Iwashimizu Hachimangu Gokokuji in Kyoto, at which he prayed for victory at the Zenkunen War, to Yuigo Tsurugaoka in Kamakura. Tsurugaoka Hachimangu was restored by Minamoto no Yoshiie (Hachimantaro Yoshiie), the third generation descendant of the Kawachi Genji. Minamoto no Yoritomo, a descendant of the Kawachi Genji, raised an army against the Taira clan and entered Kamakura, and then relocated Tsurugaoka Wakamiya to Kobayashigo Kitayama, the current location. The facilities serving as the hub of the shogunate were constructed later around the main building of the shrine. After the main building of the shrine was burned, Jogu (Hongu) and Gegu (Wakamiya) were built and a deity was invited again from Iwashimizu Hachimangu Gokokuji. After Minamoto no Yoritomo established the Kamakura shogunate, Tsurugaoka Hachimangu, for which a deity was invited by Minamoto no Yoshiie, was worshiped by samurai. After the Kamakura shogunate declined, the number of priest's cells decreased from 25, and Tsurugaoka Hachimangu temporarily declined. In the Warring States period, Tsurugaoka Hachimangu was set on fire by Satomi (siege of Kamakura), but reconstructed later by Hojo Ujitsuna. After the Edo shogunate ended, Tsurugaoka Hachimangu, as well as others, suffered a movement to abolish Buddhism (haibutsu kishaku).

Figure 10:
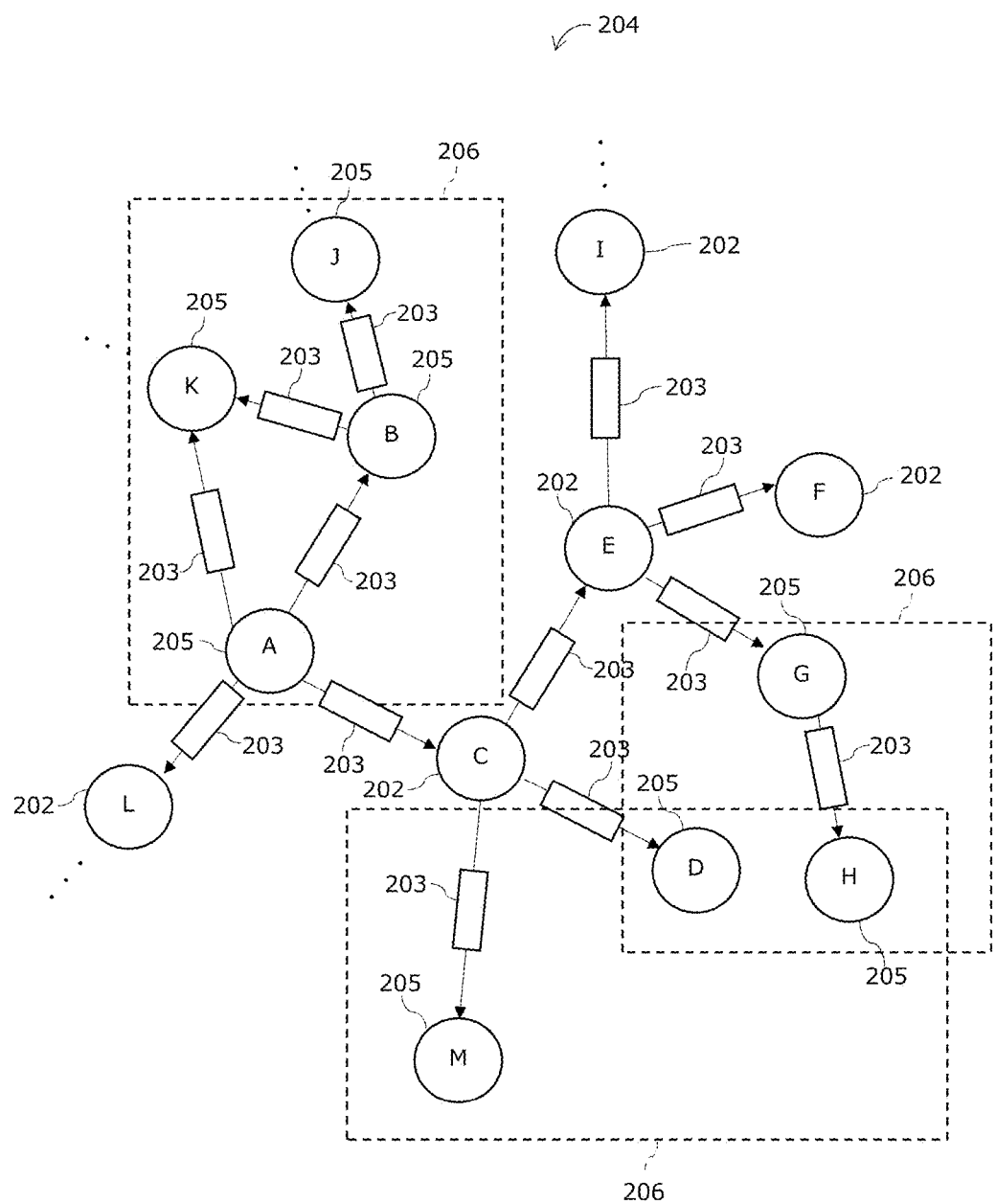
FIG. 10 is a diagram of an example ontology.

The content selling system 200 according to the present embodiment causes the displays 40*a* in the member terminals 40 to display an ontology 204 shown in FIG. 10. Using the ontology 204, the content selling system 200 causes the displays 40*a* in the member terminals 40 to display the overviews of two or more digital content items 80 stored in the content database 54. The ontology 204 is the graph 201 that extensively covers knowledge about the digital content items 80. The ontology 204 is generated from predetermined extensive content. The extensive content extensively covers knowledge in the field of the digital content items 80. The ontology 204 is the graph 201 that uses, as the nodes 202, the entities extracted from the text data included in the extensive content. In the present embodiment, the extensive content includes Wikipedia. More specifically, the extensive content includes data obtained from the external server 210. In the present embodiment, the extensive content includes reference information stored in the reference information database 254. In the present embodiment, the extensive content includes the digital content items 80 stored in the content database 54. The extensive content may include external sites other than Wikipedia. The extensive content may include no website. The extensive content may include books containing knowledge in the relevant field of the digital content items.

As shown in FIG. 10, the ontology 204 displayed on the displays 40*a* in the member terminals 40 allows distinguishing of the entities included in each digital content item 80. A cluster 206 indicates two or more entities included in a digital content item 80. The two or more entities included in a single digital content item 80 are indicated with a single cluster 206. Each cluster 206 includes two or more common nodes 205. A common node 205 is a node 202 included in the ontology 204 and is used in common by the ontology 204 and the digital content items 80. Each cluster 206 is distinguishable from the other clusters 206 using at least one of a line surrounding the two or more common nodes 205 or a color. Each cluster 206 indicates the overview of a digital content item 80 with the common nodes 205 and the edges 203. The cluster 206 indicating the overview of a digital content item 80 is distinguishable from the other clusters 206 indicating the overviews of other digital content items 80. Two or more clusters 206 may be displayed on the displays 40*a*, with parts of the clusters 206 overlapping one another. Each display 40*a* displays the ontology 204 entirely or partially based on the volume of the ontology 204.

The content control device 251 extracts entities from text data. In the present embodiment, the content control device 251 extracts entities from the text data included in each of the extensive content, the digital content items 80, and the profile data. The content control device 251 can analyze the relationship between the extracted entities as the edges 203. The content control device 251 generates the graph 201 including the edges 203 extending straight between the corresponding nodes 202. The details of profile data are described later.

The content control device 251 generates the graph 201 in the manner described below.

1) Analyze input text data in the framework of five Ws and H.
2) Any of people, goods, events, or places is allocated to each of four Ws excluding why and how.
3) Each edge 203 is allocated based on the five Ws and H analysis, using the entity factors as the nodes 202. The edge 203 represents the relationship between the factors.
4) The above operations 1 to 3 are repeated to provide the graph 201 resulting from integration of the analysis results obtained from multiple pieces of text data.

A set of triplets 209, or more specifically, the graph 201 is a list of data pieces when used by, for example, the content control device 251 in the content server 250. The graph 201 is displayed in the structure shown in, for example, FIG. 9 on the displays 40*a* in the member terminals 40.

The content selling system 200 according to the present embodiment can systematically indicate the overviews of two or more digital content items 80 to the members 20 by causing the displays 40*a* to display the ontology 204 that allows distinguishing the clusters 206 by each digital content item 80. Thus, the content selling system 200 can reduce new production of digital content items 80 that are the same as or similar to the existing digital content items 80.

Figure 11:
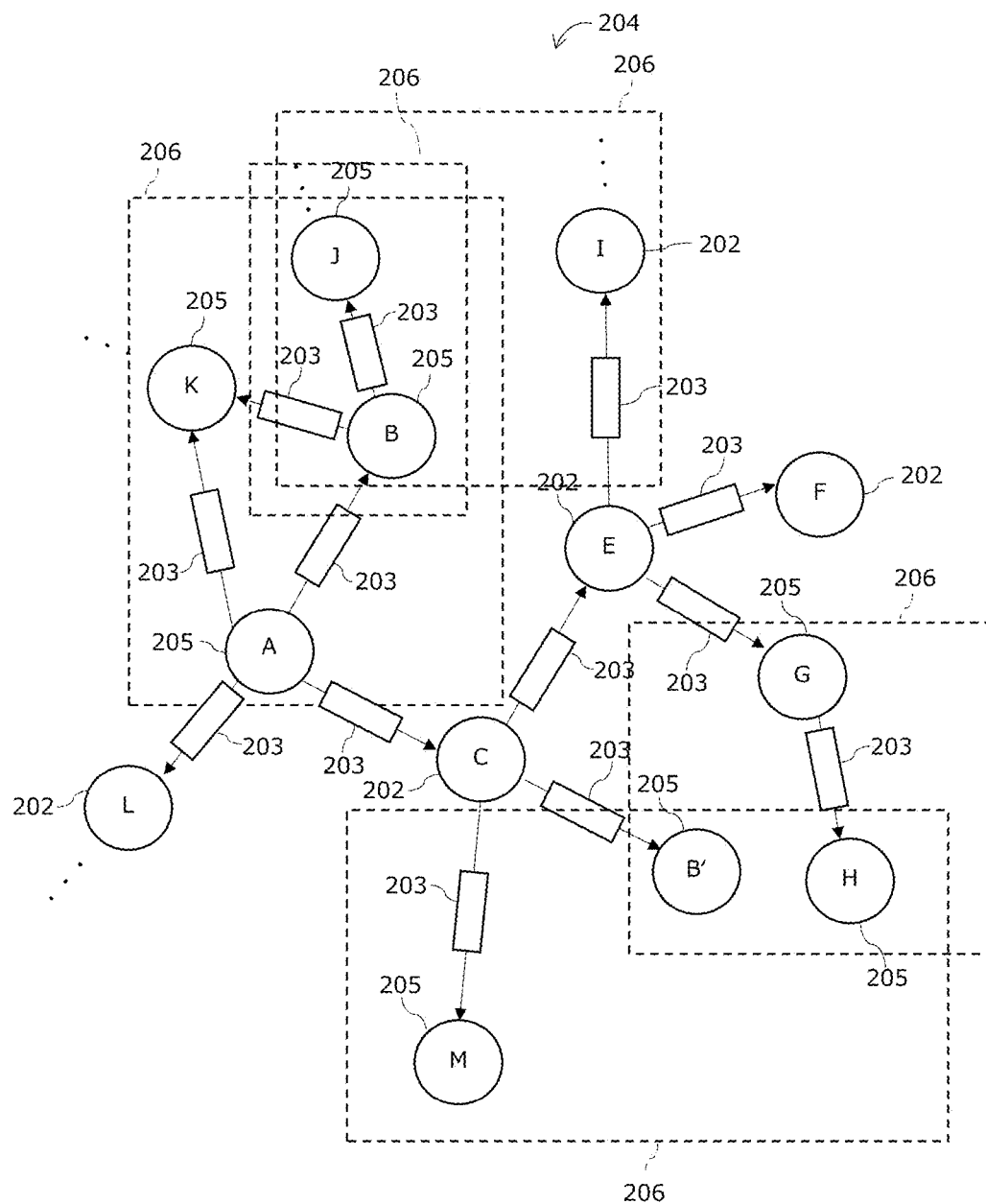
FIG. 11 is a diagram of an example ontology.

For example, two or more digital content items 80 covering the same or similar theme may include the same entity. In this case, one common node 205 corresponds to two or more digital content items 80, instead of corresponding simply to one digital content item 80. For example, as shown in FIG. 11, when the common node 205 representing B corresponds to many digital content items 80, two or more clusters 206 are displayed in a manner overlapping one another. Thus, the common node 205 corresponding to these digital content items 80 is indistinguishable. The content selling system 200 according to the present embodiment thus displays, for the ontology 204 including the common nodes 205 corresponding to more than a first predetermined number of digital content items 80, two or more common nodes 205 each representing the same entity. For example, the ontology 204 displayed on each display 40a includes the common node 205 representing B and a common node 205 representing B'. The common node 205 representing B' represents the same entity as the common node 205 representing B. The common node 205 representing B' is substantially the same as the common node 205 representing B. The common node 205 representing B' is a virtual node 202 of the common node 205 representing B. The common node 205 representing B' does not appear when handled by, for example, the content control device 251 in the content server 250, but is displayed on the displays 40a in the member terminals 40. The first predetermined number is, for example, 3 to 10 inclusive. Specifically, the first predetermined number may be 3 to 5 inclusive. More specifically, the first predetermined number may be 3. The ontology 204 displayed on the displays 40a simply shows, with a common node 205, one entity limitedly included in the first predetermined number of digital content items 80 or less. The ontology 204 displayed on the displays 40a shows the entity included in more than the first predetermined number of digital content items 80 with two or more common nodes 205. Thus, the content control device 251 can indicate the overviews of digital content items 80 similar to each other to the members 20.

When more than a second predetermined number of edges 203 extend from one node 202, the content control device 251 may cause each display 40a to display the ontology 204 including two or more nodes 202 representing the same entity. Thus, the content selling system 200 can cause each display 40a to display the graph 201 that allows the members 20 to easily view text data including the entities associated with other entities. In this manner, when a predetermined condition is satisfied, the content control device 251 causes, for improving the viewability, each display 40a to display the ontology 204 including two or more nodes 202 representing the same entity. The second predetermined number is, for example, 5 to 15 inclusive. More specifically, the second predetermined number may be, for example, 9 to 15 inclusive.

In the present embodiment, the content selling system 200 can determine whether two digital content items 80 are similar to each other. The content selling system 200 can determine whether a digital content item 80 newly produced by a main member 21 is similar to any existing digital content item 80. The content control device 251 extracts entities from the text data included in the newly produced digital content item 80 and generates the graph 201. The content control device 251 obtains the graph 201 generated from two or more digital content items 80 stored in the content database 54. The graph 201 generated from the digital content item 80 is hereafter also referred to as a content graph 208. The content control device 251 compares a newly produced content graph 208 with the existing content graph 208. In the present embodiment, the content control device 251 calculates the similarity based on the percentage of the nodes 202 matching each other, among all the nodes 202, in the graphs 201. The similarity indicates the degree by which the two digital content items 80 are similar to each other. The content control device 251 may calculate the similarity based on the percentage of the edges 203 and the nodes 202 matching each other, among all the edges 203 and all the nodes 202, in the graphs 201. For example, when a new content graph 208 includes 100 nodes 202, with 50 of the 100 nodes 202 matching the 50 nodes 202 in the existing content graph 208, the content control device 251 determines the similarity to be 50.

The content selling system 200 may determine whether a draft content item before being finished into a digital content item 80 is similar to any existing digital content item 80.

Figure 12A:
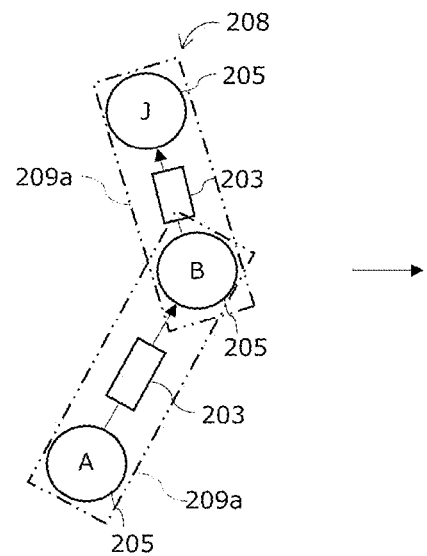
FIGS. 12A, 12B, and 12C are conceptual diagrams of a complementation process.
Figure 12B:
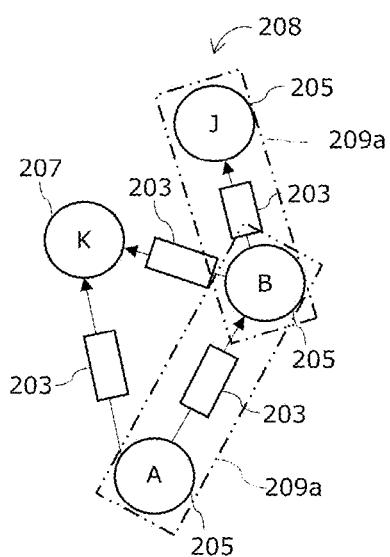
Figure 12C:
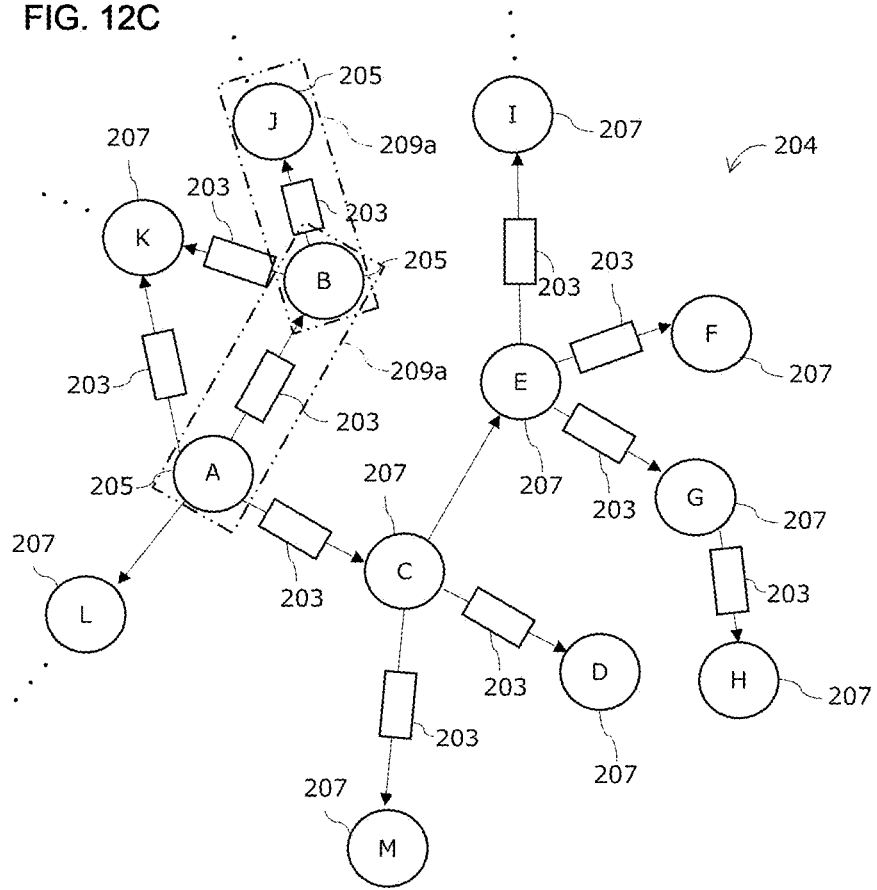

In the present embodiment, the content selling system 200 performs a complementation process before generating the content graph 208. The complementation process is performed to complement the content graph 208 based on the ontology 204. When performing the complementation process, the content control device 251 identifies each node 202 included in the ontology 204 as a common node 205 or a differential node 207. The differential node 207 is a node 202 that differs between the ontology 204 and the content graph 208. The content control device 251 complements the content graph 208 with the differential node 207 and the edges 203 that associate two common nodes 205 with each other. When, for example, the content graph 208 shown in FIG. 12A is generated, the content control device 251 identifies the node 202 representing A, the node 202 representing B, and the node 202 representing J included in the ontology 204 shown in FIG. 12C as common nodes 205 and identifies the other nodes 202 as differential nodes 207. The content control device 251 complements the content graph 208 shown in FIG. 12A with the differential node 207 representing K that associates the common node 205 representing A with the common node 205 representing B, and provides the content graph 208 shown in FIG. 12B. In the manner described above, the content graph 208 is complemented based on the ontologies 204 including nodes 202 common to each other, thus reducing the likelihood that the nodes 202 and edges 203 not matching the digital content item 80 and having the same name representing different objects are used for complement.

The content control device 251 determines whether the newly produced digital content item 80 is an n-th work based on the similarity. The content control device 251 determines two digital content items 80 having higher similarity to be similar to each other. When the similarity exceeds a predetermined value, the content control device 251 determines that the two digital content items 80 are similar to each other. The n-th work contains the same or similar information as the existing digital content item 80 that is an (n−1)-th work. For example, a derivative work, which is an n-th work with n being 2, contains the same or similar information as the existing digital content item 80 that is a primary work. The content control device 251 compares complemented content graphs 208 with each other to calculate the similarity based on the substantial information contained in the digital content items 80. For the digital content items 80 containing the substantial information items matching each other, the content graphs 208 before being complemented partially include different nodes 202 when compared. When the content graphs 208 after being complemented are compared, the nodes 202 in the content graphs 208 match each other. This matching of the substantial information items is described using digital content items 80 as quizzes in an example. A first quiz is what is the shrine founded by Minamoto no Yoriyoshi, and a second quiz is what is the shrine founded by a parent of Minamoto no Yoshiie. The second quiz is produced after the first quiz. As shown in FIG. 9, Minamoto no Yoriyoshi is the parent of Minamoto no Yoshiie, and the answer of both quizzes is Tsurugaoka Hachimangu, and the questions are similar to each other. Thus, the first quiz and the second quiz can be substantially the same information. The second quiz can be a derivative work similar to the first quiz. When comparing the complemented content graphs 208 with each other, the content control device 251 can calculate the similarity based on the substantial information contained in the digital content items 80 and determine whether the newly produced digital content item 80 is an n-th work. The content control device 251 may determine the similarity or nonsimilarity for each component 81, instead of for each digital content item 80. In this case, the content control device 251 compares the component 81 included in one digital content item 80 with the component 81 included in another digital content item 80.

In the present embodiment, the management control device 11 shown in FIG. 8 allocates the reward based on the similarity when a digital content item 80 as a derivative work is purchased by a user 71 in the content market 65. The management control device 11 calculates, based on the similarity, reward allocation for allocating the sales of the derivative work to the main member 21 who has produced a primary work. The content selling system 200 can flexibly allocate the sales of any derivative work to the main member 21 who has produced the digital content item 80 that is the primary work. When, for example, the derivative work with the similarity of 60% is purchased by a user 71, the management control device 11 calculates the allocation of 60% of the net profit to the main member 21 who has produced the primary work, and the allocation of 40% of the net profit to the main member 21 who has produced the derivative work. The token issuer 12 generates tokens corresponding to the allocation based on the similarity. The management control device 11 further allocates the allocation based on the similarity to the main members 21 in the teams 23 shown in FIG. 2 based on the contract information 31 shown in, for example, FIG. 4.

In the present embodiment, the content control device 251 shown in FIG. 8 updates the ontology 204 at a predetermined time based on the reference information. The reference information is used to produce digital content items 80. The reference information alone is insufficient for producing digital content items 80. The reference information is contributed by the members 20 including the submembers 22, and stored into the reference information database 254. The main members 21 can produce digital content items 80 based on the reference information. In this case, the content selling system 200 may allow the main members 21 who are the producers of the digital content item 80 to reward the member 20 who has contributed the reference information used to produce the digital content item 80. The content control device 251 updates the ontology 204 at a predetermined time based on the reference information newly stored in the reference information database 254. When a newly produced digital content item 80 contains an entity not included in the ontology 204, the content control device 251 may update the ontology 204 based on the digital content item 80. With the ontology 204 being updated, the content control device 251 can more efficiently perform a process of displaying the ontology 204 or complementing the content graph 208.

The reference information is, for example, the text data below.

Minamoto no Yoriyoshi invited a deity from Iwashimizu Hachimangu Gokokuji (or Tsuboi Hachimangu that was a tutelar deity for the Kawachi Genji) in August in A.D. 1063 to Yuigo Tsurugaoka in Kamakura as Tsurugaoka Wakamiya.

Minamoto no Yoriyoshi was based in Kawachi Province (Habikino, Osaka Prefecture).

When the above reference information is contributed, as shown in FIG. 9 with a two-dot-dash line, the content control device 251 adds, to the ontology 204, the node 202 representing A.D. 1063, and the edge 203 representing Foundation directed from the node 202 representing Tsurugaoka Hachimangu to the node 202 representing A.D. 1063. As shown in FIG. 9 with a two-dot-dash line, the content control device 251 further adds, to the ontology 204, the node 202 representing Kawachi Province, and the edge 203 representing Base directed from the node 202 representing Minamoto no Yoriyoshi to the node 202 representing Kawachi Province. With such addition, the content control device 251 updates the ontology 204. The content control device 251 may update the ontology 204 based on another extensive content. The content control device 251 may select information for an update under predetermined conditions.

Figure 13:
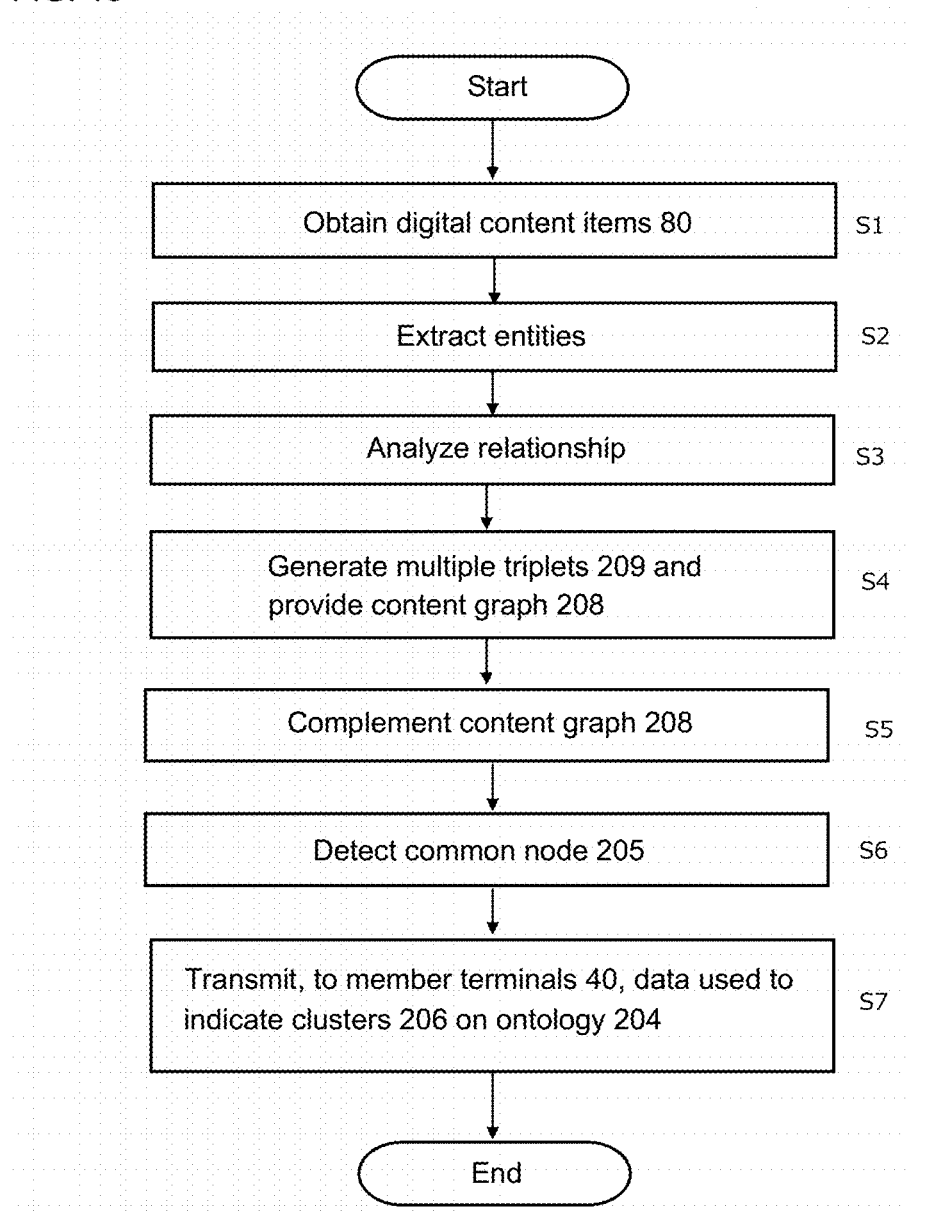
FIG. 13 is a flowchart of an ontology display process.

The content control device 251 performs a process of displaying the ontology 204 shown in FIG. 13. The displaying process is performed to cause each member terminal 40 to display the ontology 204. The content control device 251 starts the displaying process in response to an instruction from a member 20 to display the ontology 204 on the member terminals 40.

In step S1, the content control device 251 obtains two or more digital content items 80 stored in the content database 54.

In step S2, the content control device 251 extracts entities from the text data included in each digital content item 80 obtained in step S1.

In step S3, the content control device 251 analyzes the relationship between the entities extracted in step S2.

In step S4, the content control device 251 generates two or more triplets 209 and provides the content graph 208 that is a set of triplets 209.

In step S5, the content control device 251 complements the content graph 208 generated in step S4 based on the ontology 204. Steps S1 to S5 correspond to the process of complementing the content graph 208.

In step S6, the content control device 251 compares the content graph 208 complemented in step S5 with the ontology 204 and detects any common node 205.

In step S7, the content control device 251 transmits data used to indicate the clusters 206 on the ontology 204 to the member terminals 40. This allows the display 40a in each member terminal 40 to display the ontology 204 that allows distinguishing the cluster 206 for each digital content item 80. The content control device 251 ends the process of displaying the ontology 204.

The content control device 251 may store a content graph 208 generated in the past, and reuse the data in subsequent processes. The similarity identification process shown in FIG. 14 is performed by the content control device 251 to reuse the content graph 208.

Figure 14:
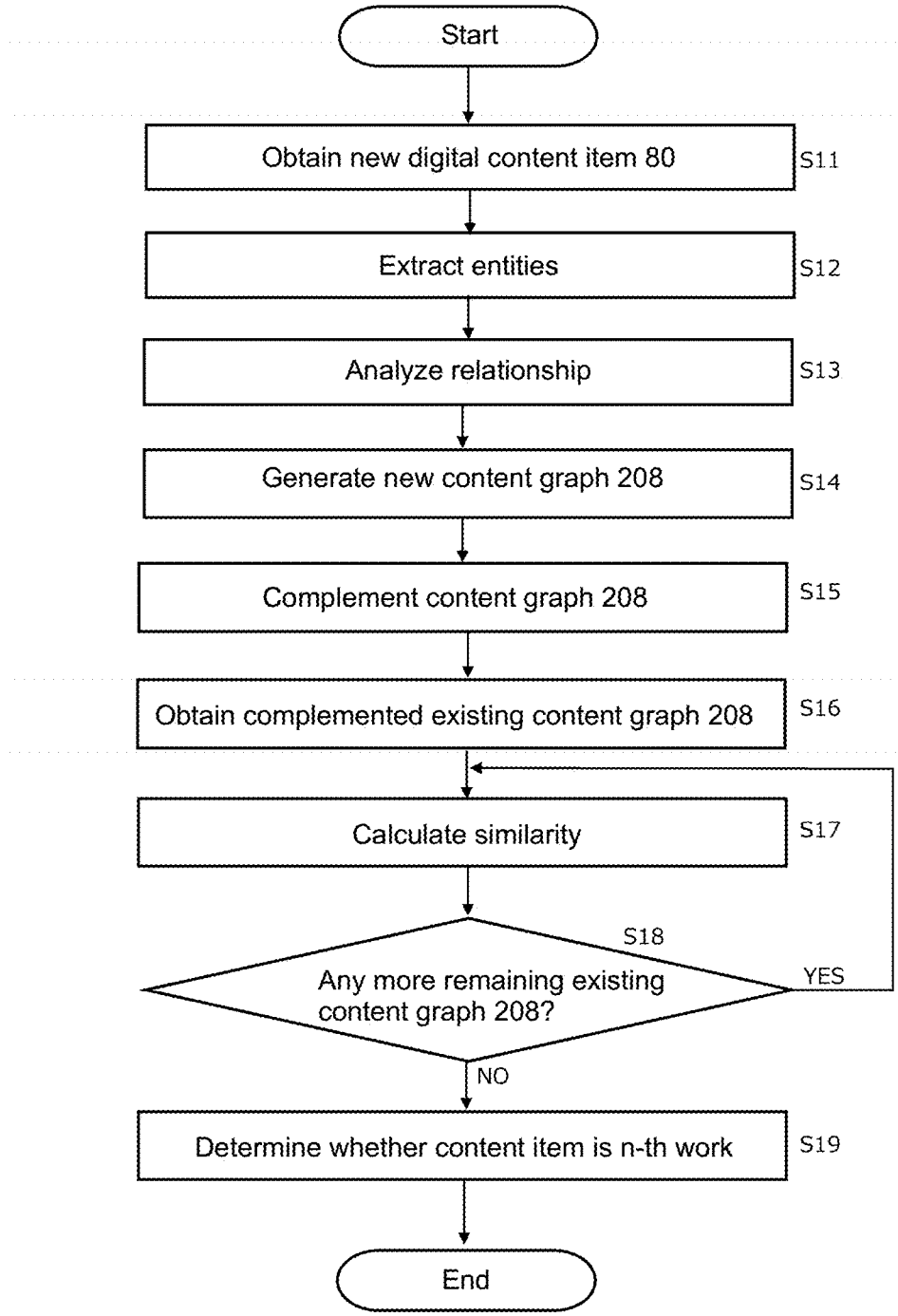
FIG. 14 is a flowchart of a similarity identification process.

The content control device 251 performs the similarity identification process shown in FIG. 14. The similarity identification process is performed to determine whether digital content items 80 are similar to each other. In response to a digital content item 80 newly contributed, the content control device 251 starts the similarity identification process.

In step S11, the content control device 251 obtains a newly produced digital content item 80.

In step S12, the content control device 251 extracts entities from the text data included in the digital content item 80 obtained in step S11.

In step S13, the content control device 251 analyzes the relationship between the entities extracted in step S12.

In step S14, the content control device 251 generates a new content graph 208 based on the entities extracted in step S12 and the relationship between the entities analyzed in step S13.

In step S15, the content control device 251 complements the content graph 208 generated in step S14 based on the ontology 204.

In step S16, the content control device 251 obtains two or more existing complemented content graphs 208.

In step S17, the content control device 251 compares the content graph 208 complemented in step S15 with the existing content graphs 208 obtained in step S16 to calculate the similarity.

In step S18, the content control device 251 determines whether any more existing content graph 208 remains to be compared with the new content graph 208. When any more existing content graph 208 remains to be compared, the content control device 251 repeats the processing in step S17 using the existing content graph 208 remaining to be compared. When no more existing content graph 208 remains to be compared, the content control device 251 proceeds to step S19.

In step S19, when the similarity calculated in step S17 exceeds a predetermined value, the content control device 251 determines that the newly produced digital content item 80 is an n-th work of the existing digital content item 80, where n is an integer greater than or equal to 2. The content control device 251 feeds back the result of the similarity identification process to the main member 21 who has produced the new digital content item 80, and ends the similarity identification process.

As described above, the content server 250 according to the second embodiment includes the content database 54 and the content control device 251. The content database 54 stores two or more digital content items 80. The digital content items 80 are produced by the members 20 of the community 24. The content control device 251 provides the content graph 208 as the graph 201. The content control device 251 provides the ontology 204 as the graph 201. The graph 201 is a set of triplets 209. Each triplet 209 includes two nodes 202 and an edge 203. The two nodes 202 represent different entities. The edge 203 represents the relationship between the nodes 202. The content graph 208 is generated from the text data included in the digital content items 80. The ontology 204 is generated from the text data included in predetermined extensive content. The extensive content extensively covers knowledge about the digital content items. The content control device 251 detects a common triplet 209a. The common triplet 209a is the triplet 209 common to the content graph 208 and the ontology 204. The content control device 251 detects a differential node 207. The differential node 207 is one of the nodes 202 included in the ontology 204 that differs between the content graph 208 and the ontology 204. The content control device 251 adds the differential node 207 to the content graph 208. The content control device 251 performs the complementation process. In the complementation process, the edges 203 each representing the relationship between the differential node 207 and each of the two nodes 202 of the common triplet 209a are added to the content graph 208.

The differential node 207 is a node 202 included in the ontology 204, but not included in the content graph 208. The content control device 251 adds, to the content graph 208, the differential node 207 connected to the common triplet 209a. Thus, the content control device 251 is less likely to complement the content graph 208 with the node 202 having the same name but representing a different object and can complement the content graph 208 with information highly likely to match the information contained in the digital content item 80.

In the content server 250 according to the present embodiment, the content control device 251 calculates the similarity. The similarity indicates the degree by which digital content items 80 are similar to each other. The similarity is calculated based on the number of nodes common to two complemented content graphs 208. The two content graphs 208 are generated from the text data included in two digital content items 80. The content control device 251 determines, based on the similarity, whether the digital content item 80 newly produced by a main member 21 is a derivative work. The derivative work contains the same information as the existing digital content item 80 as a primary work.

The content control device 251 can calculate the similarity based on the substantial information of the digital content items 80 by comparing the complemented content graphs 208 with each other.

The content server 250 according to the present embodiment further includes the reference information database 254. The reference information database 254 stores the reference information. The reference information is contributed by a member 20. The reference information is used by other main members 21 to produce a digital content item 80. The content control device 251 performs an update process. The update process is performed to add, in response to a new pieces of reference information contributed, a triplet 209 generated from the text data included in the reference information piece to the ontology 204.

The content control device 251 can more appropriately complement the content graph 208 by updating the ontology 204.

In the present embodiment, the similarity is used to calculate the allocation of the sales of a derivative digital content item 80 in the content market 65 to the main member 21 who has produced a primary digital content item 80.

The content server 250 according to the present embodiment can appropriately allocate the sales of a derivative work to the producer of the primary work based on the similarity.

The content server 250 according to the present embodiment includes the content database 54, the content control device 251, and the content communication device 52. The content database 54 sequentially stores digital content items 80 that are the activity performance information 280. The digital content items 80 are generated with the activities of the members 20 belonging to the community 24. The content control device 251 obtains, as the graph 201, the content graph 208 that is the activity performance graph. The content control device 251 obtains the ontology 204 as the graph 201. The graph 201 includes two or more nodes 202 and an edge 203. The nodes 202 represent different entities.

The edge 203 represents the relationship between the nodes 202. The content graph 208 is generated from the text data included in the digital content items 80. The ontology 204 is generated from the text data included in predetermined extensive content. The extensive content extensively covers knowledge about the digital content items 80. The content communication device 52 transmits data for the ontology 204 to the member terminals 40. The member terminals 40 are possessed by the members 20. Each member terminal 40 includes the display 40a. The content control device 251 detects a common node 205. The common node 205 is one of the nodes 202 included in the ontology 204, common to the content graph 208 and the ontology 204. The ontology 204 displayed on the display 40a allows distinguishing the two or more common nodes 205 corresponding to a digital content item 80 from the two or more common nodes 205 corresponding to each of other digital content items 80.

The cluster 206 including two or more common nodes 205 indicates the overview of a digital content item 80. The content server 250 causes the displays 40a in the member terminals 40 to display the ontology 204 that allows distinguishing the common nodes 205 for each digital content item 80 and thus can systematically indicate the overviews of two or more digital content items 80. The content server 250 allows the members 20 browsing the ontology 204 displayed on the displays 40a to learn the overviews of existing digital content items 80. This system can reduce production of digital content items 80 that are the same as or similar to existing digital content items 80.

In the present embodiment, when satisfying a predetermined condition, the ontology 204 displayed on each display 40a includes two or more common nodes 205 each representing the same entity. Thus, the content server 250 can reduce the likelihood that the clusters 206 of the common nodes 205 representing the overviews of digital content items 80 are less identifiable by the members 20 when the digital content items 80 include a relatively large number of similar items.

Figure 15:
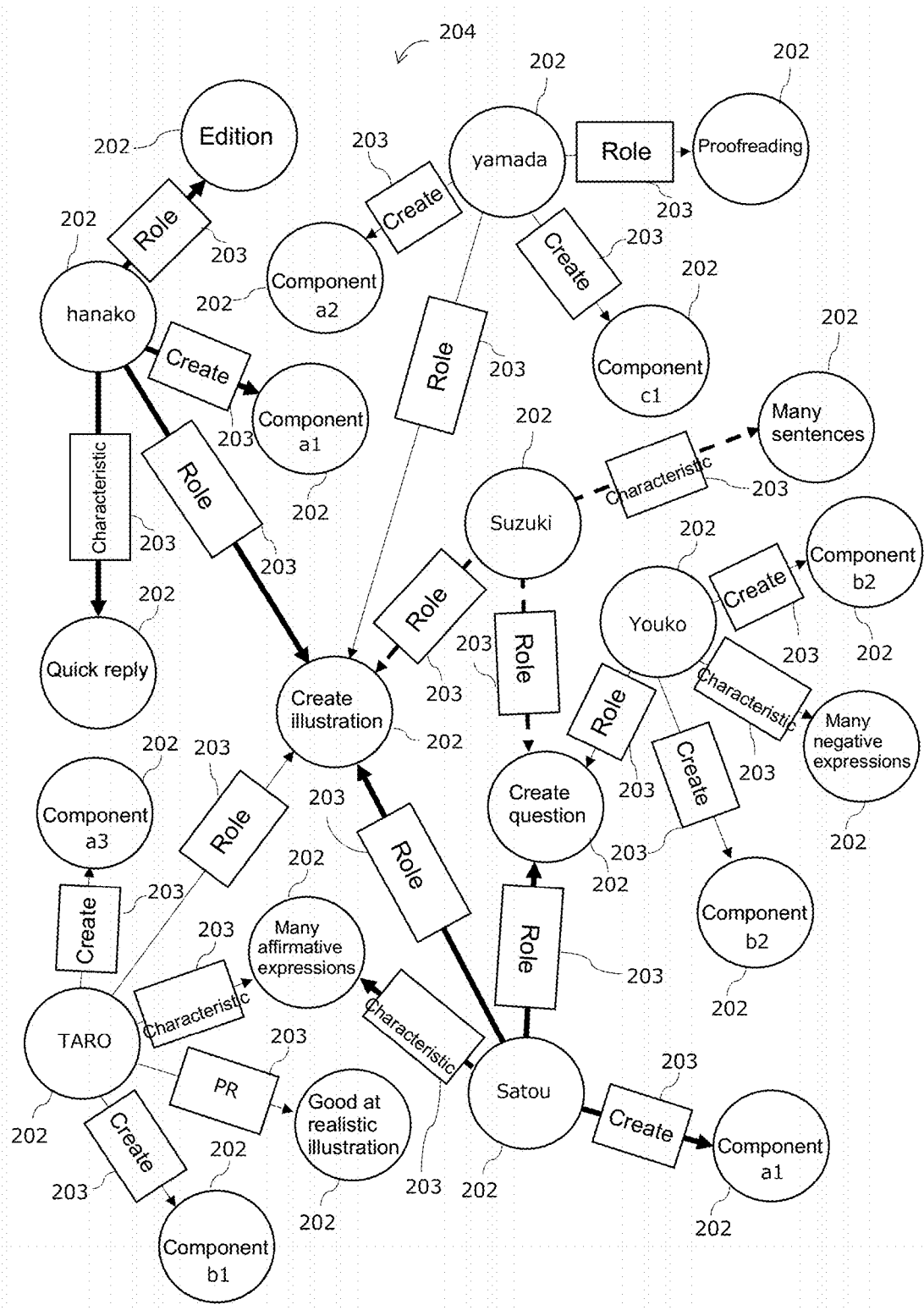
FIG. 15 is a diagram of an example ontology for profile data.

As shown in FIG. 15, the content selling system 200 according to the present embodiment causes the member terminals 40 to display the ontology 204 generated based on the profile data of the members 20. The ontology 204 generated based on the profile data shows the overviews of the profiles of the members 20. The profile data indicates at least one of the user name, the assignment, the achievement data, the evaluation, the characteristics, the declaration, or the activity of each member 20. In the present embodiment, the assignment is, for example, composing text, drawing illustration, edition, and advertisement. The achievement data is based on the achievement of each member 20 in the community 24. In the present embodiment, the achievement is indicated by the components 81 generated by the members 20. The characteristics of the members 20 indicate the trends in communication with other members 20. The characteristics of the members 20 include, for example, more or fewer affirmative expressions, more or fewer negative expressions, quicker or slower replies, and more or fewer sentences per message in communication with other members 20. The characteristics of the members 20 are generated based on communication data. The communication data includes messages exchanged between the members 20 using the member terminals 40. The management server 10 obtains the communication data, and generates the characteristic data by sorting each entry for the members 20. The characteristic data may be generated using generation words that may be preset. The generation words include, for example, good, nice, and high quality as affirmative expressions. The generation words include, for example, poor, many errors, and low quality as negative expressions. Using the characteristic data, the content selling system 200 according to the present embodiment achieves displaying the ontology 204 that indicates the actual activities of the members 20 in the community 24. This ontology 204 is used, for example, as a reference when the members 20 recruit a new main member 21.

In the present embodiment, the ontology 204 displayed on the displays 40a in the member terminals 40 allows distinguishing the profiles of the members 20 by the type of edge 203. For example, the node 202 associated with hanako is connected with the edges 203 indicated by relatively bold arrows. The node 202 associated with Suzuki is connected with the edges 203 indicated by dotted arrows.

The content control device 251 may distinguishably manage achievement data and declaration data. The declaration data includes information intended by the members 20 to appeal to the other members 20. The content control device 251 may separately display or hide the achievement data and the declaration data in response to operations performed by the members 20. This broadens the range of the profile of each member 20 shown by the ontology 204. The ontology 204 displayed on the member terminals 40 may allow distinguishing the achievement data from the declaration data in any manner other than using the edges 203, and may use different sizes or colors for the circles of the nodes 202.

Using the ontology 204 generated based on the profile data, the content control device 251 may recommend, to the main members 21 that newly establish a team 23, other members 20 as candidates for main members 21 of the new team 23.

With the above structure, the content server 250 according to the present embodiment can systematically show, for recruiting main members 21 of the teams 23, the members 20 with different profiles in the community 24, and facilitate comparison between the members 20.

In the present embodiment, the content control device 251 generates the characteristic data based on the communication data. The communication data indicates the details of the communication between the members 20 through the member terminals 40. The characteristic data indicates the characteristics of the members 20. The profile data includes the characteristic data. Thus, the content control device 251 can cause each display 40a to display the ontology 204 showing the communication trends of the members 20 in the community 24.

The profile data includes the achievement data and the declaration data. The achievement data is based on the achievement of the members 20 in the community 24. The declaration data is declared by the members 20. The content control device 251 distinguishably manages the achievement data and the declaration data. The content server 250 can thus broaden the range of the profile of each member 20 shown by the ontology 204.

Figure 16:
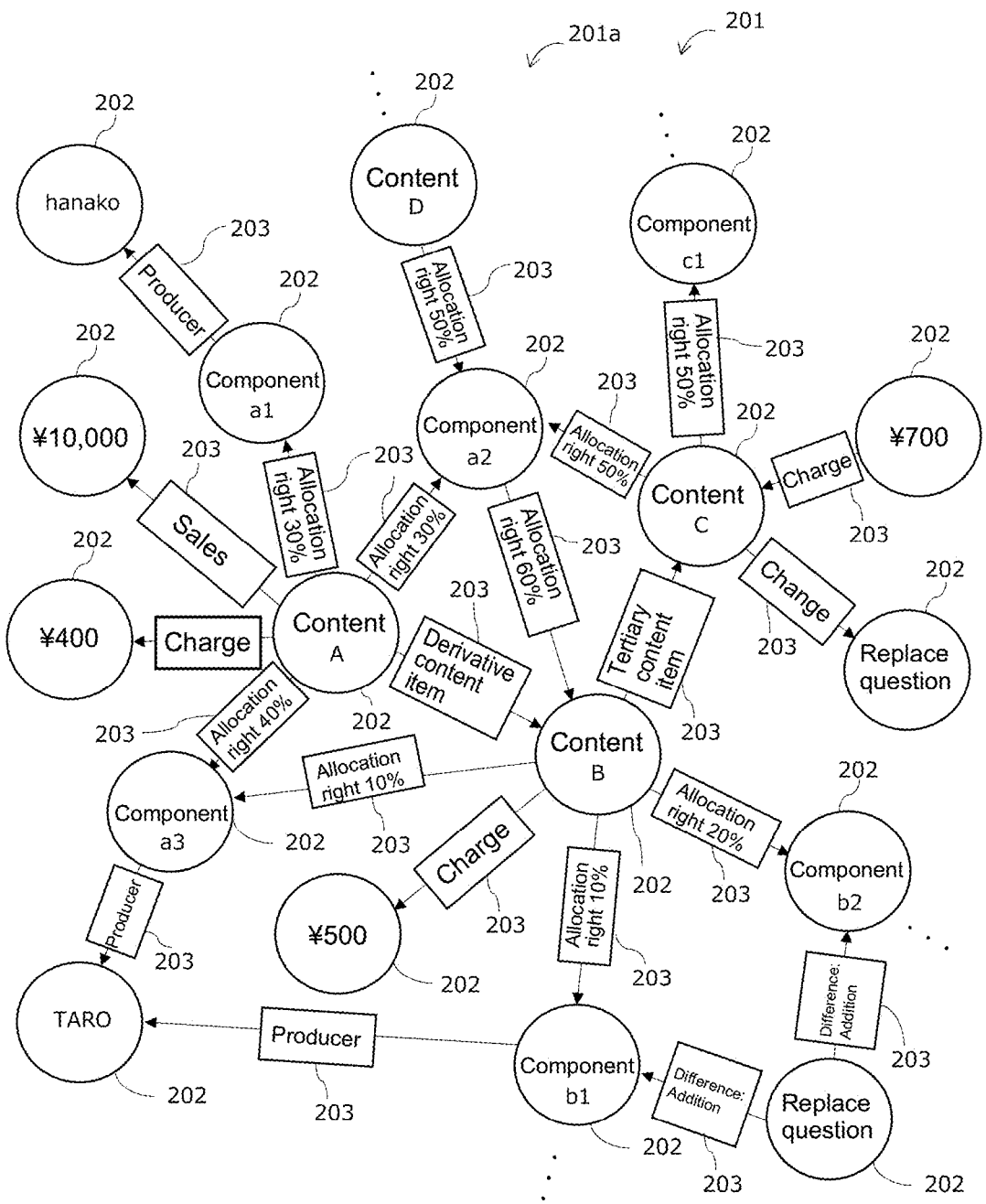
FIG. 16 is a diagram of an example analytical graph.

The content server 250 according to the present embodiment can cause the display 40a in each member terminal 40 to display a graph 201 shown in FIG. 16. Hereafter, the graph 201 used for analysis by the members 20 is also referred to as an analytical graph 201a. The analytical graph 201a shows, for example, sales amounts as the entities. The analysis is, for example, examining the reason for high sales of a specific digital content item 80 in the content market 65. The analysis is, for example, examining the trends in the components 81 contained in digital content items 80 with high sales in the content market 65. In the present embodiment, the entities include identification information of digital content items 80, the selling price of digital content items 80 in the content market 65, the sales amounts of digital content items 80 in the content market 65, a change in a derivative digital content item 80 from a primary work, identification information of components 81, and ID information of the main members 21. In the present embodiment, the analytical graph 201a includes the nodes 202 representing the identification information of the digital content items 80, the nodes 202 representing the selling prices of the digital content items 80, the node 202 representing the sales amounts of the digital content items 80, the nodes 202 representing the identification information of the components 81, the nodes 202 representing the ID information of the main members 21, and the nodes 202 representing a change in a derivative digital content item 80 from a primary work. In the present embodiment, each edge 203 extends from the node 202, as a center, representing the identification information of the digital content item 80 to the nodes 202 representing different entities. For example, the node 202 representing content A that is a digital content item 80 is connected to the node 202 representing a component a1 with the edge 203 representing an allocation of 30%. The node 202 representing the content A that is a digital content item 80 is connected to the node 202 representing the selling price of ¥400 with the edge 203 representing a charge. In the present embodiment, the analytical graph 201a including, as centers, the nodes 202 each representing identification information of a digital content item 80 includes edges 203 representing producers extending from the respective nodes 202 representing identification information of the components 81 to the respective nodes 202 representing the ID information of the main member 21.

The graph 201 shows the main member 21 who has produced a component 81 by connecting the node 202 representing the identification information of the component 81 and the node 202 representing the ID information of the main member 21 with the edge 203 representing a producer. The analytical graph 201a shows the percentage of the component 81 included in a digital content item 80 by connecting the node 202 representing the identification information of the component 81 and the node 202 representing the identification information of the digital content item 80 with the edge 203 representing an allocation. The analytical graph 201a shows that a digital content item 80 is an n-th work of another digital content item 80 by connecting the node 202 representing the identification information of the digital content item 80 and the node 202 representing the identification information of another digital content item 80 with the edge 203 representing the n-th content item. The analytical graph 201a shows the selling price of a digital content item 80 in the content market 65 by connecting the node 202 representing the identification information of the digital content item 80 and the node 202 representing the selling price with the edge 203 representing a charge. The graph 201 shows the sales amount of a digital content item 80 in the content market 65 by connecting the node 202 representing the identification information of the digital content item 80 and the node 202 representing the sales amount with the edge 203 representing sales.

In the present embodiment, the content control device 251 extracts entities from the text data included in each of the sales data, the contract information, and the digital content items 80. The sales data indicates the sales of digital content items 80 in the content market 65. The content control device 251 obtains sales data from the market server 60 through the content communication device 52. As described above, the contract information indicates the allocation right of the components 81 included in digital content items 80 and the main member 21 who has produced each component 81. In the present embodiment, each digital content item 80 further includes, in addition to the two or more components 81, information indicating the selling price of a digital content item 80 and another digital content item 80 that is an n-th work of the digital content item 80. The selling price of a digital content item 80 may be determined and input by the main member 21 as a producer or automatically determined by the content control device 251 based on the sales and the selling prices of other digital content items 80. The information indicating another n-th digital content item 80 may be input by the main member 21 as the producer or may be information indicating whether another digital content item 80 is an n-th work as determined by the content control device 251 based on the similarity. The content control device 251 generates the analytical graph 201a in response to an instruction from a member 20 through the member terminal 40. The content control device 251 transmits the data for the generated analytical graph 201a to the member terminals 40 through the content communication device 52. The content server 250 can thus cause the display 40a in each member terminal 40 to display the analytical graph 201a. The analytical graph 201a displayed on the display 40a is browsed by, for example, a member 20 who newly produces a digital content item 80, and is used for marketing the digital content items 80 with high sales. The content control device 251 may generate the analytical graph 201a including, as a center, the node 202 representing the entity other than the identification information of digital content items 80. In response to an instruction from a member 20 through the member terminal 40, the content server 250 causes the display 40a to display the analytical graphs 201a having different nodes 202 as centers in a switchable manner. The analytical graph 201a including the nodes 202 of two or more different types enhances analysis efficiency.

Figure 17:
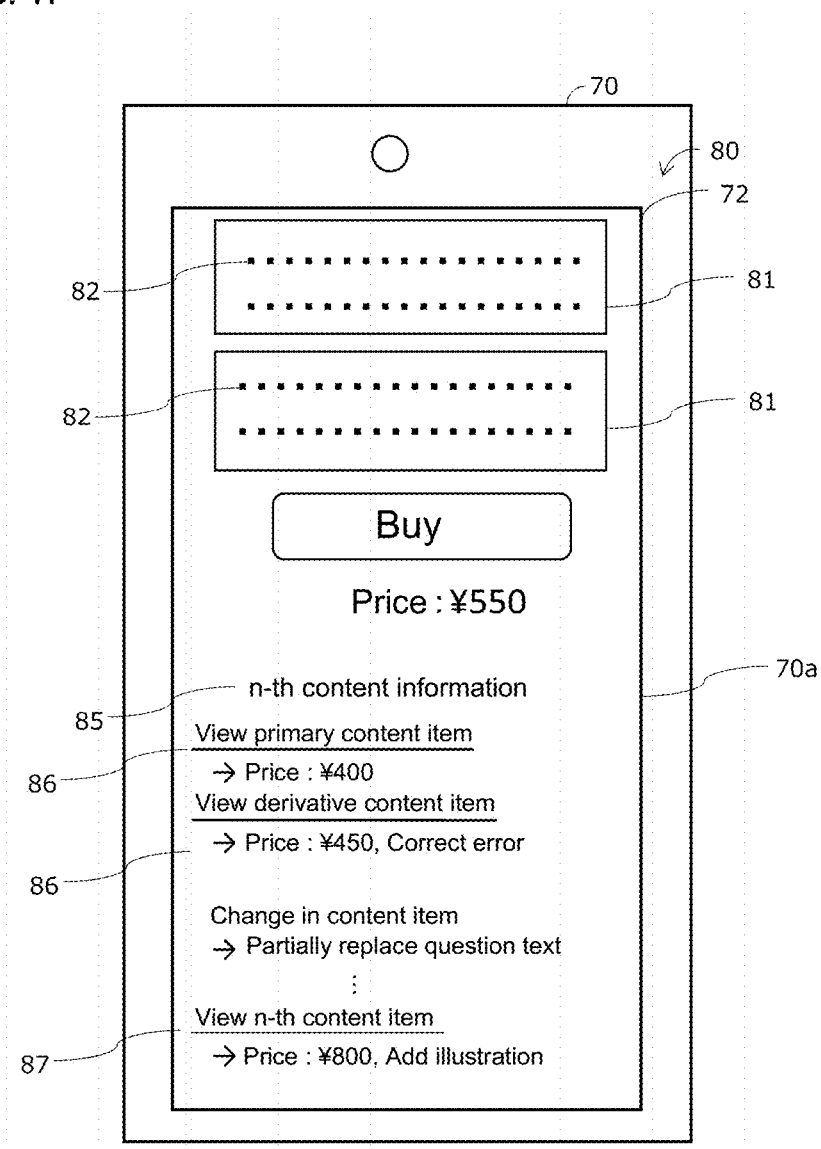
FIG. 17 is a diagram of an example purchase screen.

In the present embodiment, the content server 250 stores the complex relationship between digital content items 80 in the form of the graph 201. The content selling system 200 causes the user terminals 70 to display a purchase screen 72 shown in FIG. 17. In the present embodiment, the market server 60 causes a display 70a in each user terminal 70 to display the purchase screen 72 based on the analytical graph 201a. The purchase screen 72 displays a digital content item 80. The purchase screen 72 displays n-th work information 85. The n-th work information 85 indicates material information 86 and derivative information 87. The material information 86 is information about another digital content item 80 used to produce the digital content item 80 displayed on the purchase screen 72. When the digital content item 80 displayed on the purchase screen 72 is a tertiary content item, the material information 86 is, for example, the selling prices of a primary content item and a derivative content item, a change from the primary content item to the derivative content item, a change from the derivative content item to the tertiary content item, or a link to the purchase screen 72 for selling the primary content item or the derivative content item. The derivative information 87 is information about another digital content item 80 produced by using the digital content item 80 displayed on the purchase screen 72. When the digital content item 80 displayed on the purchase screen 72 is an (n−1)-th content item, the derivative information 87 is, for example, the selling price of the n-th content item, a change from the (n−1)-th content item to the n-th content item, and a link to the purchase screen 72 for selling the n-th content item. Thus, the purchase screen 72 shows, together with the information about the displayed digital content item 80, a difference from another digital content item 80 subordinate to the displayed digital content item 80 based on the analytical graph 201*a*. Thus, the content selling system 200 can provide the users 71 considering purchase of the displayed digital content item 80 with the minimum information items about the digital content item 80 used by the users 71. The digital content item 80 produced in relatively short time and less effort is generally sold at a low selling price. The users 71 can thus find, on the purchase screen 72, the digital content item 80 containing the minimum components 81 intended by the users and can purchase the digital content item 80 at a reasonable price.

Figure 18:
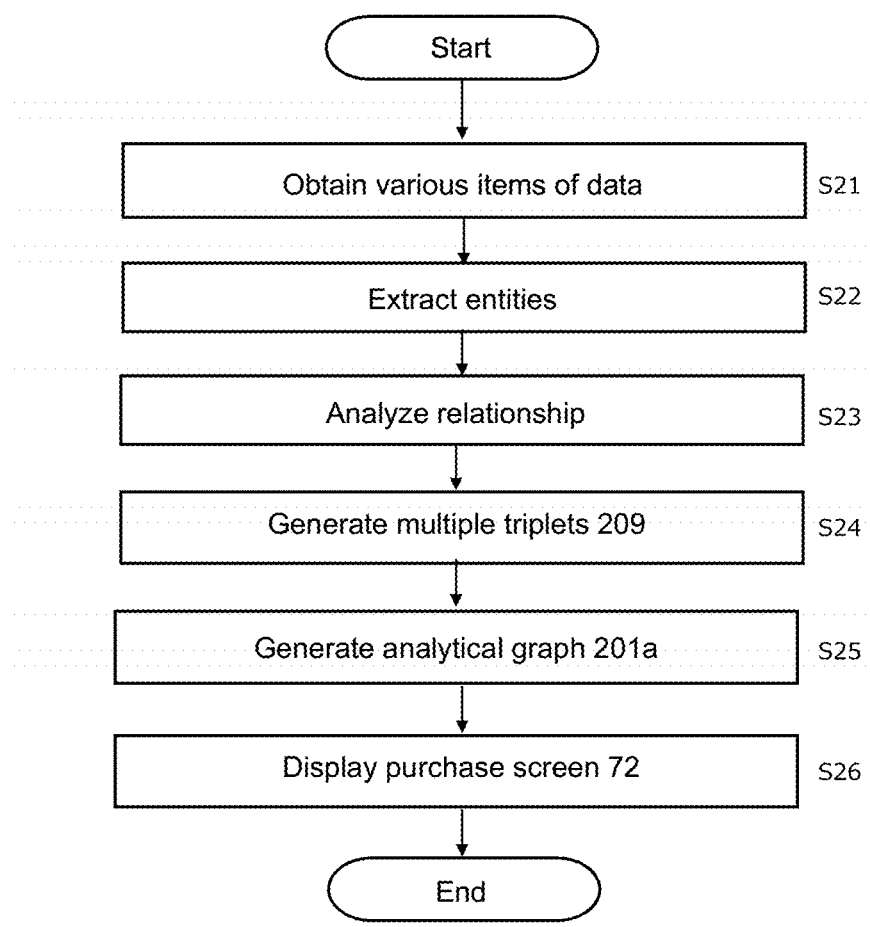
FIG. 18 is a flowchart of a process of displaying a purchase screen.

As shown in FIG. 18, the content selling system 200 performs a process of displaying the purchase screen 72.

In step S21, the content control device 251 obtains various items of data for generating the analytical graph 201*a*.

In step S22, the content control device 251 extracts entities from the text data included in the various items of data.

In step S23, the content control device 251 analyzes the relationship between the entities extracted in step S22.

In step S24, the content control device 251 generates multiple triplets 209.

In step S25, the content control device 251 provides the analytical graph 201*a* that is a set of triplets 209.

In step S26, in response to an operation performed by a user 71, the market server 60 causes the user terminals 70 to display the subordination based on the analytical graph 201*a*, and ends the process of displaying the purchase screen 72.

As described above, the content server 250 manages digital content items 80. The digital content items 80 are sold in the content market 65. The digital content items 80 each include components 81. The components 81 are produced by two or more main members 21 of the community 24. The content server 250 includes the content communication device 52 and the content control device 251. The content communication device 52 communicates with the member terminals 40. Each member terminal 40 includes the display 40*a*. The member terminals 40 are possessed by the members 20. The content control device 251 obtains sales data and contract information. The sales data is the sales data of the digital content items 80 in the content market 65. The contract information indicates the components 81 included in each digital content item 80 and the main members 21 who have produced the respective components 81. The content control device 251 causes the displays 40*a* to display the analytical graph 201*a* through the content communication device 52. The analytical graph 201*a* includes two or more nodes 202 and an edge 203. The nodes 202 represent different entities extracted from the sales data and the contract information. The edge 203 represents the relationship between the nodes 202. The analytical graph 201*a* shows the identification information of the digital content items 80 as identification information. The analytical graph 201*a* shows the sales amounts of the digital content items 80 in the content market 65 as entities. The analytical graph 201*a* shows the identification information of each component 81 as an entity. The analytical graph 201*a* shows the ID information that is the identification information of each main member 21 as an entity. The analytical graph 201*a* includes edges 203 each extending from the node 202, as a center, representing the identification information of a digital content item 80 to the nodes 202 representing different entities.

The analytical graph 201*a* displayed on the displays 40*a* in the member terminals 40 systematically indicates the relationship between factors including the main members 21, the components 81 produced by the main members 21, the digital content items 80 including components 81, and the sales of the digital content items 80. The content server 250 can cause the display 40*a* in each member terminal 40 to display the analytical graph 201*a* that collectively and clearly show, to the members 20, the relationship between factors including people, goods, and money, facilitating analysis of the relationship between the factors.

In the present embodiment, the analytical graph 201*a* shows the main member 21 who has produced a component 81 by connecting the node 202 representing the identification information of the component 81 and the node 202 representing the identification information of the main member 21 with an edge 203. The analytical graph 201*a* shows the components 81 included in a digital content item 80 by connecting the node 202 representing the identification information of each component 81 and the node 202 representing the identification information of the digital content item 80 with an edge 203. The analytical graph 201*a* connects the node 202 representing the identification information of a digital content item 80 to the node 202 representing the identification information of another digital content item 80 with an edge 203 to show that one of the two digital content items 80 connected with the edge 203 is a derivative work produced by using the other of the two digital content items 80.

The content server 250 can cause the displays 40*a* in the member terminals 40 to display the analytical graph 201*a* showing the manner in which the components 81 produced by any of the main members 21 are used in derivative digital content items 80. The above analytical graph 201*a* allows analysis of the relationship among the producers, the components 81, and the derivative uses.

In the present embodiment, in response to an instruction from a member 20, the content control device 251 switches the graph displayed on the display 40*a* from the analytical graph 201*a* having, as a center, the node 202 representing the identification information of a digital content item 80 to the analytical graph 201*a* having, as a center, the node 202 representing a different entity. The content control device 251 can cause the displays 40*a* to display the analytical graph 201*a* that is convenient to the users.

In the present embodiment, the analytical graph 201*a* further includes the node 202 representing a change. The change is a change from a primary digital content item 80 to a derivative digital content item 80. The node 202 representing the change is connected to, with an edge 203, the node 202 representing the identification information of the primary digital content item 80. The analytical graph 201*a* further includes the node 202 representing the price at which a digital content item 80 is sold in the content market 65. The content control device 251 can cause the displays 40*a* to display the analytical graph 201*a* that allows analysis based on more factors.

The content selling system 200 according to the present embodiment includes the content market 65, the user terminals 70, the content control device 251, and the content database 54. The content market 65 sells digital content items 80. The digital content items 80 are generated by members of a community. The user terminals 70 are possessed by the users 71. The users 71 purchase digital content items 80 from the content market 65. The content control device 251 manages the members 20. The content control device 251 obtains the sales data and the contract information. The sales data is the sales data of the digital content items 80 in the content market 65. The contract information indicates the components 81 included in the digital content items 80 and the main members 21 who have produced the components 81. The content control device 251 generates the analytical graph 201a. The analytical graph 201a includes two or more nodes 202 and an edge 203. The nodes 202 represent different entities extracted from the sales data and the contract information. The edge 203 represents the relationship between the nodes 202. The content database 54 stores the analytical graph 201a. The analytical graph 201a includes, as entities, the identification information of digital content items 80, the sales amounts of the digital content items 80 in the content market 65, the identification information of the components 81, and the ID information. The analytical graph 201a includes edges 203 extending from the node 202, as a center, representing the identification information of digital content items 80 to the nodes 202 representing different entities. Thus, the content selling system 200 can collectively manage complex information about the digital content items 80 with a reduced data volume.

More specifically, the content selling system 200 according to the present embodiment has the features described below for the graph 201.

Volume
Velocity
Variety

A relational database involves joining of tables to determine whether a specific piece of data has a relationship with another piece of data. A relational database is based on a relational model in which data sets referred to as tables that includes rows and columns are associated with each other. In contrast, the database for the graph 201 holds information indicating a relationship for each piece of data, allowing direct tracing of the relationship. Thus, in tracing the relationship between the factors represented by the nodes 202, a relational database repeatedly joins tables and increases time involved in the tracing, whereas the database for the graph 201 ends the tracing immediately. Additionally, the content selling system 200 according to the present embodiment can implement the scalability that is free from hierarchy by using the graph 201.

Although one or more embodiments of the present inventions are described above, the structures of each device, the control method, and other details are not limited to those in the above embodiments.

For example, in the first embodiment, the allocation right is allocated from the main members 21 to the submembers 22 based on assignment offers, but the allocation may be performed differently. In another embodiment of the present invention, instead of an allocation right, a member 20 may reward another member 20 with points or tokens possessed by the member 20. For example, when a submember 22 who has received an assignment offer from a main member 21 submits the product to the main member 21, the points of the main member 21 may be shifted to the submember 22.

In another embodiment, the components 81 in the above embodiments may be the equivalents of digital content items 80.

The structures other than the above may also be modified in various manners within the scope not departing from the gist of the present invention. The structures in the embodiments and modifications may be combined with one another. Embodiments implemented by modifying these embodiments as appropriate are also included in the technical scope of the present invention.

In the system described in Non-Patent Literatures 1 and 2, contributors are to have a skill of producing content items such as novels or cartoons. The system described in Non-Patent Literatures 1 and 2 can present obstacles before contributors contribute content items and earn incentives.

In contrast, one or more embodiments of the present disclosure are directed to providing a management server, a management system, and a management program for implementing a system in which multiple people are involved in the production of one digital content item and rewarded.

More specifically, a management server according to a first aspect of the present disclosure manages members of a community. The community produces digital content items, and sells the digital content items in a content market. The digital content items each include two or more components produced by the members. The management server includes a management communication device, a management database, and a management control device. The management communication device communicates with member terminals. The member terminals are possessed by the members. The management database stores contract information. The contract information indicates the component for which authority is set and the allocation of sales in a manner associated with ID information. The ID information identifies the members. The authority allows registration of digital content items with a format for contributing the digital content items to the content market. The sales are the sales of any digital content item sold in the content market. The management control device transmits tokens to the member terminals through the management communication device based on the contract information. The tokens correspond to an allocation.

Such a management server can implement a system in which multiple people are involved in the production of one digital content item and rewarded.

In the management server according to the first aspect of the present disclosure, the community includes two or more teams. Each team produces digital content items. The members are classified at least as a main member or a submember. The main members belong to any of the teams, and are provided with authority. The submembers assist in producing the digital content items. The main members each have an allocation right. The allocation right is a right to receive an allocation based on the authority. The contract information further indicates the type of member. The type of member includes a main member or a submember. When a submember joins a team and becomes a new main member, the management control device causes the management database to store the contract information. The contract information indicates, in a manner associated with the ID information of the new main member, the component corresponding to the authority allocated by an existing main member. The contract information indicates an allocation corresponding to the allocation right allocated by the existing main member.

This structure allows the main members to freely allow submembers to join a team under their authority. This system involves no approval from other main members for joining of a new main member and can thus reduce the time for enrollment, improving the quality of the digital content items.

In the management server according to the first aspect of the present disclosure, when a main member offers an assignment to a submember, the management control device causes the management database to store the contract information in a manner associated with the ID information of the submember. The assignment is relevant to the production of a digital content item. The contract information indicates an allocation corresponding to the allocation right allocated from the main member.

This structure allows the main members to freely enroll submembers under their allocation rights, and thus can improve the work efficiency.

The management system according to the first aspect of the present disclosure manages the members of the community. The community produces digital content items and sells the digital content items in a content market. The digital content items each include two or more components produced by the members. The management system includes a management communication device, a storage system, and a management control device. The management communication device communicates with member terminals. The member terminals are possessed by the members. The storage system stores contract information using a blockchain. The storage system may store the contract information using a graph database. The ID information identifies the members. The contract information indicates the component for which the authority is set and the allocation of sales in a manner associated with the ID information. The authority allows registration of digital content items with a format for contributing the digital content item to the content market. The sales are the sales of any digital content item sold in the content market. The management control device transmits tokens to the member terminals through the management communication device based on the contract information. The tokens correspond to an allocation.

Such a management system can implement a system in which multiple people are involved in the production of one digital content item and rewarded.

The human-relationship graph generating device described in Patent Literature 1 can complement the relationship between characters not referred to in the text data preliminarily added to the content item by obtaining complement data that is text data available on a network. However, the technique described in Patent Literature 1 obtains the complement data available on a network using the content name such as the program name or the title as a keyword, and may thus erroneously complement the graph with a different content item having the same content name.

In contrast, one or more embodiments of the present disclosure are directed to providing a content server and a program that correctly complement a graph showing the overviews of content items.

More specifically, a content server according to one or more aspects of the present disclosure includes a content database and a content control device. The content database stores two or more digital content items. The digital content items are produced by the members of the community. The content control device obtains a content graph as a graph. The content control device obtains an ontology as a graph. The graph is a set of triplets. Each triplet includes two nodes and an edge. The two nodes represent different entities. The edge represents the relationship between the nodes. The content graph is generated from the text data included in the digital content items. The ontology is generated from text data included in predetermined extensive content. The extensive content extensively covers knowledge in the field of the digital content items. The content control device detects a common triplet. The common triplet is common to the content graph and the ontology. The content control device detects a differential node. The differential node is one of the nodes included in the ontology and different between the content graph and the ontology. The content control device performs a complementation process. The content control device adds the differential node to the content graph. The content control device adds, to the content graph, edges each representing the relationship between the differential node and the two nodes of the common triplet.

The differential node is a node included in the ontology but not included in the content graph. The content control device adds, to the content graph, the differential node connected to the common triplet and the edge connected to the differential node. Thus, the content control device is less likely to complement the content graph with a node having the same name but representing a different object and can complement the content graph with information highly likely to match the information contained in the digital content items.

In the content server according to the present disclosure, the content control device calculates similarity. The similarity indicates the degree by which digital content items are similar to each other. The similarity is calculated based on the number of nodes common to two complemented content graphs. The two content graphs are generated from the text data included in two digital content items. The content control device determines whether a digital content item newly produced by a member is a derivative work based on the similarity. The derivative work contains the same information as an existing digital content item that is a primary work.

The content control device can calculate the similarity based on the substantial information contained in digital content items by comparing the complemented content graphs with each other.

The content server according to the present disclosure further includes a reference information database. The reference information database stores reference information. The reference information is contributed by any of the members. The reference information is used by other members to produce digital content items. The content control device performs an update process. The update process is performed to add, in response to a new piece of reference information contributed, a triplet generated from the text data included in the reference information pieces to the ontology.

The content control device can more appropriately perform the process of complementing the content graph by updating the ontology.

In one or more aspects of the present disclosure, the similarity is used to calculate the allocation of the sales of a derivative digital content item in the content market to the member who has produced the primary digital content item.

The content server allows flexible allocation of the sales of the derivative work to the producer of the primary work based on the similarity.

The technique described in Patent Literature 1 is used to simply indicate one content item with one graph, and does not systematically indicate the overviews of two or more content items.

In contrast, one or more aspects of the present disclosure are directed to providing a content server and a program that can systematically indicate the overviews of two or more content items.

More specifically, a content server according to one or more aspects of the present disclosure includes a content database, a content control device, and a content communication device. The content database sequentially stores items of activity performance information. The activity performance information is generated based on the activities performed by the members belonging to the community. The content control device obtains an activity performance graph as a graph. The content control device obtains an ontology as a graph. The graph shows two or more nodes and an edge. The nodes represent different entities. The edge represents the relationship between the nodes. The activity performance graph is generated from the text data included in the activity performance information. The ontology is generated from the text data included in predetermined extensive content. The extensive content exhaustively covers knowledge about the activity performance information. The content communication device transmits data for the ontology to member terminals. The member terminals are possessed by the members. Each member terminal includes a display. The content control device detects a common node. The common node is one of the nodes included in the ontology and is common to the activity performance graph and the ontology. The ontology displayed on the display allows distinguishing two or more common nodes corresponding to the activity performance information from the two or more common nodes corresponding to other activity performance information.

A cluster of two or more common nodes indicates the overview of the activity performance information. The content server causes the displays of the member terminals to display the ontology that allows distinguishing the common nodes for each item of activity performance information to systematically indicate the overviews of two or more items of activity performance information.

The activity performance information according to one or more aspects of the present disclosure is digital content items or profile data. The digital content items are produced by the members. The digital content items are sold in the content market. The profile data indicates the skill of each member associated with the digital content items.

In the content server according to one or more embodiments of the present disclosure, the ontology displayed on the display includes two or more common nodes representing the same entity when satisfying a predetermined condition. Thus, the content server can reduce the likelihood that the clusters of the common nodes representing the overviews of activity performance information items are less identifiable by the members when the activity performance information items include a relatively large number of similar items.

In the content server according to one or more aspects of the present disclosure, the content control device generates characteristic data based on communication data. The communication data indicates the communication between the members through the member terminals. The characteristic data indicates the characteristics of the members. The profile data includes the characteristic data. Thus, the content control device can cause the displays to display the ontology showing the communication trends of the members in the community.

The profile data includes achievement data and declaration data. The achievement data is based on achievement of the members in the community. The declaration data is declared by the members. The content control device distinguishably manages the achievement data and the declaration data. The content server can thus broaden the range of the profile of each member shown by the ontology.

REFERENCE SIGNS LIST 20 member
21 main member
24 community
40 member terminal
40a display
52 content communication device
54 content database
65 content market
70 user terminal
80 digital content item
81 component
201a analytical graph
202 node
203 edge
250 content server
251 content control device

The invention claimed is:

1. A content selling system, comprising:
a content market configured to sell digital content items, one or more of the digital content items, each of which includes one or more components, produced by members of a community;
member terminals;
a management server that includes a content communication device and is configured to communicate with the member terminals, each of which includes a display, the member terminals being possessed by each of the two or more members, respectively;
a user terminal possessed by a user purchasing one of the digital content items from the content market; and
a content database configured to store data of a graph structure that includes a plurality of triplets,
wherein:
in the content data base, each of the triplets includes one node and two edges associated with the one node;
the triplets are connected with one another via the two edges of the each of the triplets;
each of the edges indicates relationship between the nodes included in two of the triplets;
one of the nodes comprises data of one of the digital content items to be sold;
another one of the nodes comprises data of the one or more of the components;
another one of the nodes comprises data of a selling price of one of the digital content items; and
the display of the each of the member terminals is configured to display a graph based on the data of the graph structure; and
the management server includes a processor and a storage, and that accesses the content database, the member terminals, and the user terminal, thereby assisting sales of the digital content items in the content market.

2. The content selling system according to claim 1, another one of the nodes comprises identification information of one of the digital content items.

3. The content selling system according to claim 1, one of the digital content items is a primary work product and another one of the digital content items is a derivative work product based on the primary work product.

4. A non-transitory computer-readable storage medium storing a program executable by a computer for managing digital content items sold in a content market, the digital content items each of which includes two or more components produced by members of a community, the program causing the computer to function as:
a content market that sells digital content items, one or more of the digital content items, each of which includes one or more components, produced by members of a community;
a management server with a content communication device, which communicates with member terminals, each of which includes a display, the member terminals being possessed by each of the two or more members, respectively, and accesses a content database, the member terminals, and the user terminal, thereby assisting sales of the digital content items in the content market, wherein:

the content database stores data of a graph structure that includes a plurality of triplets;

in the content data base, each of the triplets includes one node and two edges associated with the one node;

the triplets are connected with one another via the two edges of the each of the triplets;

each of the edges represents relationship between the nodes included in two of the triplets;

one of the nodes comprises data of one of the digital content items to be sold;

another one of the nodes comprises data of the one or more of the components;

another one of the nodes comprises data of a selling price of one of the digital content items; and the display of the each of the member terminals is configured to display a graph based on the data of the graph structure.

\* \* \* \* \*